(12) United States Patent
Isman et al.

(10) Patent No.: US 10,437,701 B2
(45) Date of Patent: *Oct. 8, 2019

(54) DATA GENERATION

(71) Applicant: Ab Initio Technology LLC, Lexington, MA (US)

(72) Inventors: Marshall A. Isman, Newton, MA (US); Richard A. Epstein, Yarmouth, ME (US)

(73) Assignee: Ab Initio Technology LLC, Lexington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/181,582

(22) Filed: Nov. 6, 2018

(65) Prior Publication Data

US 2019/0073289 A1    Mar. 7, 2019

Related U.S. Application Data

(63) Continuation of application No. 14/573,038, filed on Dec. 17, 2014, now Pat. No. 10,185,641.

(60) Provisional application No. 61/917,727, filed on Dec. 18, 2013.

(51) Int. Cl.
*G06F 9/44* (2018.01)
*G06F 11/36* (2006.01)

(52) U.S. Cl.
CPC .......... *G06F 11/36* (2013.01); *G06F 11/3688* (2013.01)

(58) Field of Classification Search
CPC ....................................................... G06F 9/44
See application file for complete search history.

(56) References Cited

U.S. PATENT DOCUMENTS

| | | |
|---|---|---|
| 5,664,187 A | 9/1997 | Burkes et al. |
| 6,546,389 B1 | 4/2003 | Agrawal et al. |
| 6,567,936 B1 | 5/2003 | Yang |
| 6,581,058 B1 | 6/2003 | Fayyad et al. |
| 6,643,648 B1 | 11/2003 | Ross et al. |
| 6,728,699 B1* | 4/2004 | Lautzenheiser ... G06F 16/24539 |
| 6,957,161 B2 | 10/2005 | Allen et al. |
| 7,080,063 B2 | 7/2006 | Campos |
| 7,085,981 B2 | 8/2006 | Aggarwal |

(Continued)

FOREIGN PATENT DOCUMENTS

| | | |
|---|---|---|
| CN | 1495584 | 5/2004 |
| DE | 19911176 | 9/2000 |

(Continued)

OTHER PUBLICATIONS

Search Report and Written Opinion issued in Singapore Patent Application No. 11201604364U, dated Dec. 3, 2018.

(Continued)

*Primary Examiner* — Jae U Jeon
(74) *Attorney, Agent, or Firm* — Fish & Richardson P.C.

(57) ABSTRACT

A method includes receiving data indicative of a number of times each of one or more rules was executed by a data processing application during processing of one or more records; based on the number of times each of the rules was executed by the data processing application, determining a content criterion for each of one or more particular fields; generating content for each of the particular fields based on the content criterion; and populating each of the particular fields with the generated content.

37 Claims, 22 Drawing Sheets

(56) References Cited

U.S. PATENT DOCUMENTS

| | | | |
|---|---|---|---|
| 7,194,317 | B2 | 3/2007 | Kothare et al. |
| 7,266,699 | B2 | 9/2007 | Newman |
| 7,334,466 | B1 | 2/2008 | Brislin |
| 7,849,075 | B2 | 12/2010 | Gould et al. |
| 8,069,129 | B2 | 11/2011 | Gould |
| 8,117,221 | B2 | 2/2012 | Elteto et al. |
| 8,209,549 | B1 | 6/2012 | Bain, III |
| 9,002,770 | B2 | 4/2015 | Gould |
| 9,092,577 | B2 | 7/2015 | Chishiro |
| 2002/0138492 | A1 | 9/2002 | Kil |
| 2004/0107189 | A1 | 6/2004 | Burdick |
| 2005/0114369 | A1 | 5/2005 | Gould |
| 2005/0125211 | A1 | 6/2005 | Nahata |
| 2005/0240862 | A1 | 10/2005 | Palmer |
| 2005/0288910 | A1 | 12/2005 | Schlessinger et al. |
| 2006/0179075 | A1 | 8/2006 | Fay |
| 2006/0242610 | A1 | 10/2006 | Aggarwal |
| 2007/0106666 | A1 | 5/2007 | Beckerele |
| 2007/0174030 | A1 | 7/2007 | Yun et al. |
| 2007/0199074 | A1 | 8/2007 | Levine et al. |
| 2007/0256061 | A1 | 11/2007 | Victorov |
| 2008/0033960 | A1 | 2/2008 | Banks |
| 2008/0118150 | A1 | 5/2008 | Balakrishnan et al. |
| 2009/0066507 | A1 | 3/2009 | Lewington |
| 2009/0122676 | A1 | 5/2009 | Tanizawa |
| 2009/0132575 | A1 | 5/2009 | Kroeschel et al. |
| 2009/0172643 | A1 | 7/2009 | Maruchi |
| 2009/0254514 | A1 | 10/2009 | Adair |
| 2009/0327196 | A1* | 12/2009 | Studer .................. G06F 8/00 706/47 |
| 2010/0198769 | A1 | 8/2010 | Gould |
| 2010/0306854 | A1 | 12/2010 | Neergaard |
| 2010/0318481 | A1 | 12/2010 | Feynman |
| 2011/0131002 | A1 | 6/2011 | Sheye |
| 2011/0153575 | A1* | 6/2011 | Glasser ............. G06F 16/2465 707/690 |
| 2011/0173149 | A1* | 7/2011 | Schon ............. G06F 16/24564 706/48 |
| 2011/0179011 | A1 | 7/2011 | Cardno et al. |
| 2012/0030165 | A1 | 2/2012 | Guirguis et al. |
| 2012/0197887 | A1 | 8/2012 | Anderson |
| 2014/0222752 | A1 | 8/2014 | Isman |
| 2014/0282573 | A1 | 9/2014 | Clark |
| 2015/0169428 | A1 | 6/2015 | Isman |

FOREIGN PATENT DOCUMENTS

| | | |
|---|---|---|
| JP | H07-219810 | 8/1995 |
| JP | 10-030943 | 2/1998 |
| JP | 2001-256076 | 9/2001 |
| JP | 2006-163831 | 6/2006 |
| JP | 2006-221647 | 8/2006 |
| JP | 2006-236220 | 9/2006 |
| JP | 2009-110179 | 5/2009 |
| JP | 2011-204069 | 10/2011 |
| JP | 2013-015961 | 8/2013 |
| WO | WO2002/084531 | 10/2002 |
| WO | WO2008/124319 | 10/2008 |
| WO | 2012/104907 | 9/2012 |

OTHER PUBLICATIONS

Bertino, Elisa et. al., "A Framework for Evaluating Privacy Preserving Data Mining Algorithms." Data Mining and Knowledge Discovery, 11, 121-154, 2005.

Black, John, et al., "Ciphers with Arbitrary Finite Domains," Source Lecture Notes in Computer Science; vol. 2271 archive, Proceedings of the The Cryptographer's Track at the RSA Conference on Topics in Cryptology table of contents, 2002, pp. 114-130.

Chakraborty, Soubhik et al., "A Statistical Approach to Modeling Indian Classical Music Performance," Oct. 2008, Cornell University, 24 pgs.

Chinese Office Action, with English translation, CN application No. 2010800354097, dated Nov. 21, 2013, 17 pages.

"Data Sanitization Techniques," A Net 2000 Ltd. White Paper, 2005, 10 pages.

Edgar, Dale, "Data Sanitization Techniques" [retrieved Aug. 1, 2013] Retrieved from the Internet <URL:http://www.orafaq.com/papers/data_sanitization.pdf>.

International Search Report & Written Opinion in PCT application No. PCT/US10/36812, dated Aug. 3, 2010, 8 pages.

International Search Report & Written Opinion issued in PCT application No. PCT/US10/38018, dated Aug. 23, 2010, 10 pages.

International Search Report & Written Opinion issued in PCT/US2014/070747, dated May 29, 2015.

International Preliminary Report on Patentability issued in PCT/US2014/070747, dated Jun. 21, 2016.

Japanese Office Action, with English Translation, JP application No. 2012-515111, dated Feb. 18, 2014, 14 pages.

Japanese Office Action, with English Translation, JP application No. 2012-514029, dated Mar. 27, 2014.

Kimura, Hirofumi, EASYCAP for ORACLE: data base test data generation tool, Dr. Dobb's Journal Japan, Jan. 1, 1999, vol. 8, 1st Issue, p. 138-139.

Lee, Joochang, et. al., "A Data Sanitization Method for Privacy Preserving Data Re-publication." IEEE, 2008, 4 pages.

Luby, Michael et al., "How to construct pseudorandom permutations from pseudorandom Functions," SIAM J. Comput. vol. 17 # 2, Apr. 1988, pp. 373-386.

Maurer, Ueli, "A simplified and generalized treatment of Luby-Rackoff pseudorandom permutation generators," in 'Advances in Cryptology—EUROCRYPT '92 (Lecture Notes in Computer Science)', Berlin: Springer Verlag, vol. 658, pp. 239-255, 1992.

Parameswaran, Rupa et al., "A Robust Data-obfuscation Approach for Privacy Preservation of Clustered Data," Proceedings of the Workshop on Privacy and Security Aspects of Data Mining, pp. 18-25, 2005.

Price, Huw, "A Short guide to Scrambling, Masking and Obfuscating Production Data," Grid-Tools Ltd., Feb. 6, 2009, pp. 1-17.

Supplementary European Search Report, EP10783895, dated Dec. 11, 2012, 5 pages.

Tanabe, Tsuneo, EASYCAP for ORACLE Ver 1.0, Visual Basic magazine, Japan, Shoeisha, Mar. 1, 1999, vol. 5, 7th issue, p. 168-171.

Umeda, Hironori, Software Development Support Tool (System Integrator) for Oracle SI Object Browser Ver. 8.0, DB Magazine, Japan, Shoeisha, Jun. 1, 2003, vol. 13, 3rd issue, p. 241-245.

Wang, En Tzu, et. al., "A Novel Method for Protecting Sensitive Knowledge in Association Rules Mining." IEEE, Annual International Computer Software and Application Conference (COMPSAC), 2005, 6 pages.

An introduction to programming and problem solving with pascal :Schneider, 1982, Wiley.

Transaction History, U.S. Appl. No. 12/497,354, Jul. 10, 2013, 1 page.

Transaction History, U.S. Appl. No. 12/797,509.

Transaction History, U.S. Appl. No. 14/573,038.

Relative frequency table and histogram:StatWMich, 2003, Retrieved from the internet http://www.stat.wmich.edu/s216/book/node11.htm.

Korean Office Action in Application No. 10-2012-7000470, dated Dec. 11, 2015, 7 pages.

European Search Report in Application No. 107838955, dated May 12, 2016 (5 pages).

Korean Office Action in Application No. 10-2015-7008165, dated Feb. 17, 2016 (5 pages).

Canadian Office Action in Application No. 2,764,390, dated Apr. 4, 2016 (4 pages).

Australian Office Action in Application No. 2010256869, dated Dec. 10, 2015 (3 pages).

European Office Action in European Application No. 10786799.6, dated May 23, 2017, 5 pages (with English translation).

Bakken D et al, "Data Obfuscation: Anonymity and Desensitization of Usable Data Sets", vol. 2, No. 6, IEEE, XP011123201, pp. 34-41 (2004).

(56) References Cited

OTHER PUBLICATIONS

Japanese Office Action issued in JP2016-536923, dated Nov. 9, 2018 (English Translation).

Tetsuhiro Kodama et al., "Ideas for Effective Testing: The Approach of Test Engineering Method 'STEM,'" Software Test Press, Gijutsu-Hyohron Co. Ltd. 8:74-96 (Feb. 25, 2009) (partial machine translation).

Tatshiro Tsuchiya et al., A Survey of Parwise Testing—for enhanced efficiency of software testing, IEICE Transactions, The Institute of Electronics, Information and Communication Engineers (IEICE), vol. J90-D, No. 10, 2663-2674 (Oct. 1, 2007) (Machine translation).

\* cited by examiner

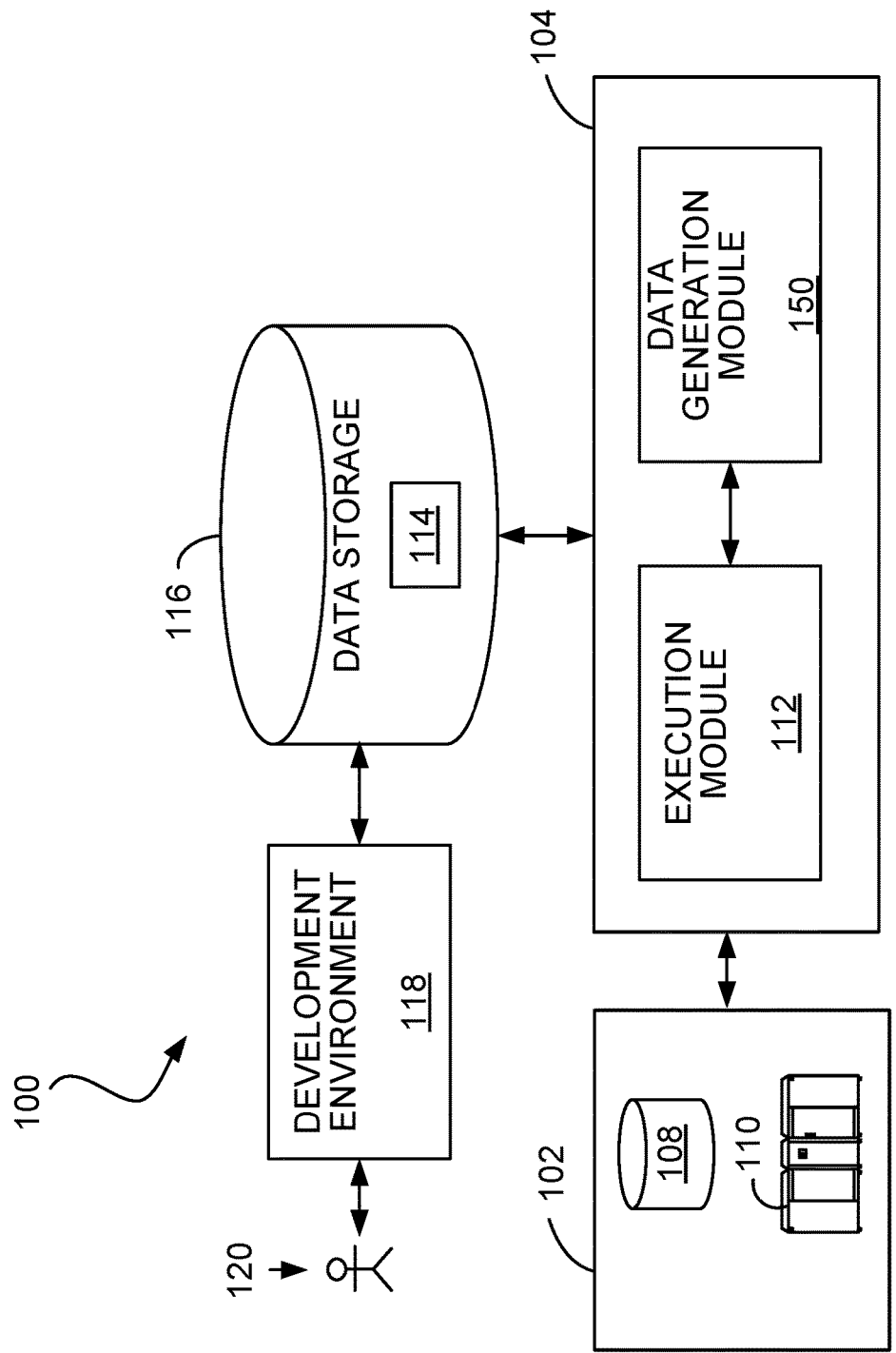

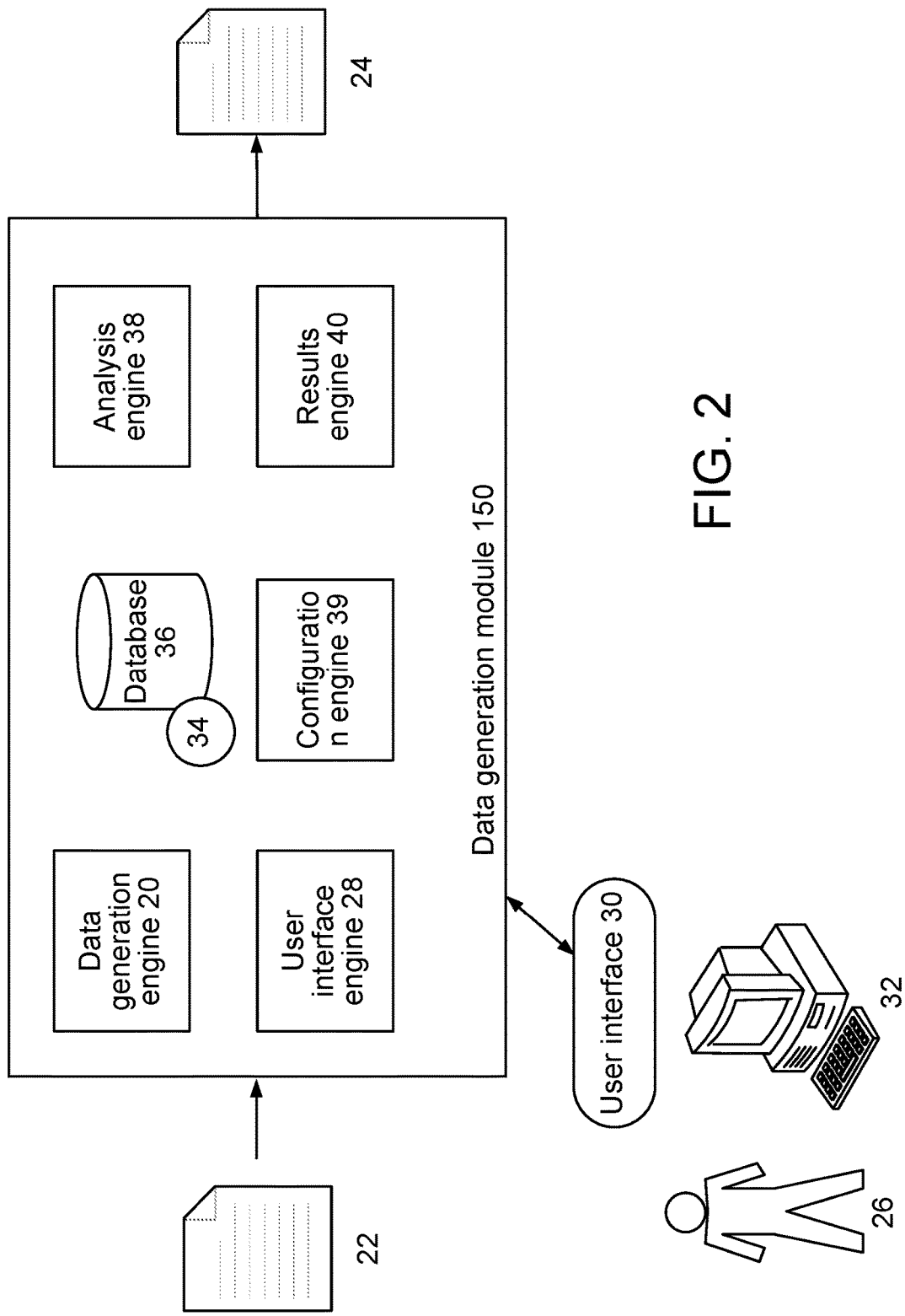

200

| cust_ID | name | cust_age | state |
|---|---|---|---|
| 21324 | Jane Smith | 28 | MA |
| 45621 | Harry White | 45 | NY |
| 21354 | Sarah Chen | 31 | MA |
| 56324 | Sally Harris | 34 | RI |
| 54326 | Mary Jones | 38 | CT |
| 43215 | Mike Johnson | 29 | MA |

| cust_ID | name | cust_age | state |
|---|---|---|---|
| 21324 | Jane Smith | 28 | MA |
| 45621 | Harry White | 25 | NY |
| 21354 | Sarah Chen | 31 | MA |
| 56324 | Sally Harris | 34 | RI |
| 54326 | Mary Jones | 38 | CT |
| 43215 | Mike Johnson | 29 | MA |

| cust_ID | name | cust_age | state | Age_range | Cust_income |
|---|---|---|---|---|---|
| 21324 | Jane Smith | 19 | MA | 18-25 | $20,467 |
| 45621 | Harry White | 45 | NY | 40-55 | $45,326 |
| 21354 | Sarah Chen | 31 | MA | 25-40 | $60,245 |
| 56324 | Sally Harris | 34 | RI | 25-40 | $98,760 |
| 54326 | Mary Jones | 38 | CT | 25-40 | $85,198 |
| 43215 | Mike Johnson | 29 | MA | 25-40 | $70,870 |

| cust_ID | name | cust_age | state |
|---|---|---|---|
| 21324 | Jane Smith | 28 | MA |
| 45621 | Harry White | 45 | NY |
| 21354 | Sarah Chen | 31 | MA |
| 56324 | Sally Harris | 34 | RI |
| 54326 | Mary Jones | 38 | CT |
| 43215 | Mike Johnson | 29 | MA |
| 54321 | Erin Davis | 48 | MA |
| 56532 | GinaSimons | 60 | NY |
| 32423 | Beth Philips | 55 | CA |
| 43218 | David O'Brien | 51 | NH |

FIG. 3D

Target Record Format

Notes:
Fields in the target record format but not in the source record format are marked with double asteriks (**).
Fields in the source record format but not in the target record format are not shown.

Ordered List:

Input Items:
Filter... 702

- custid (decimal)
- fname (string)
- lname (string)
- place (string)
- building_num (decimal)
- preferred (decimal)
- newline (string)
- last_transaction (datetime) **
- customer_since (date) **

Add>
<Remove
<<Remove All
Move Up
Move Down selected items:
- custid (decimal)
- fname (string)
- lname (string)
- building_num (decimal)

704

Apply
OK  Cancel

FIG. 8

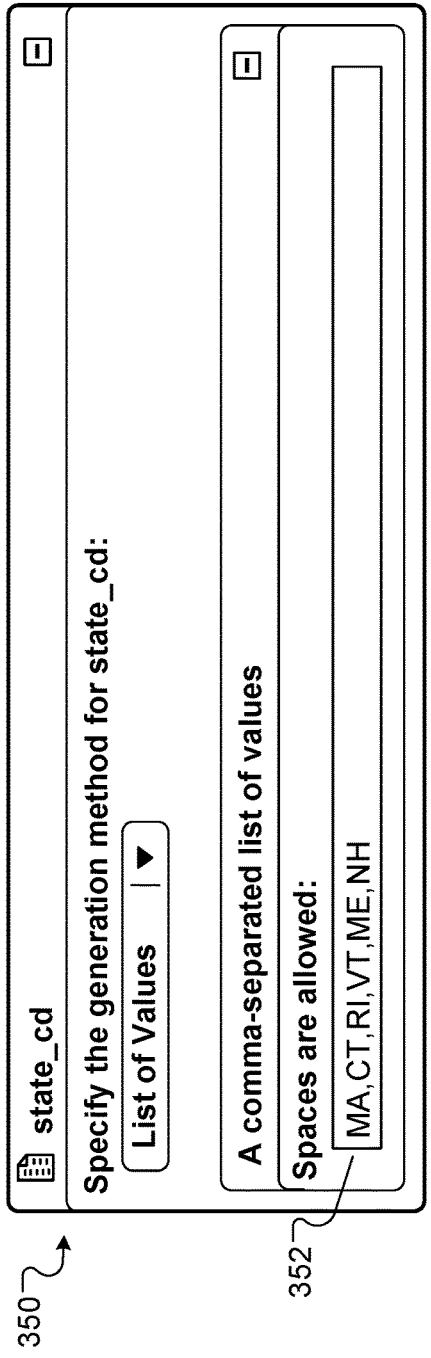
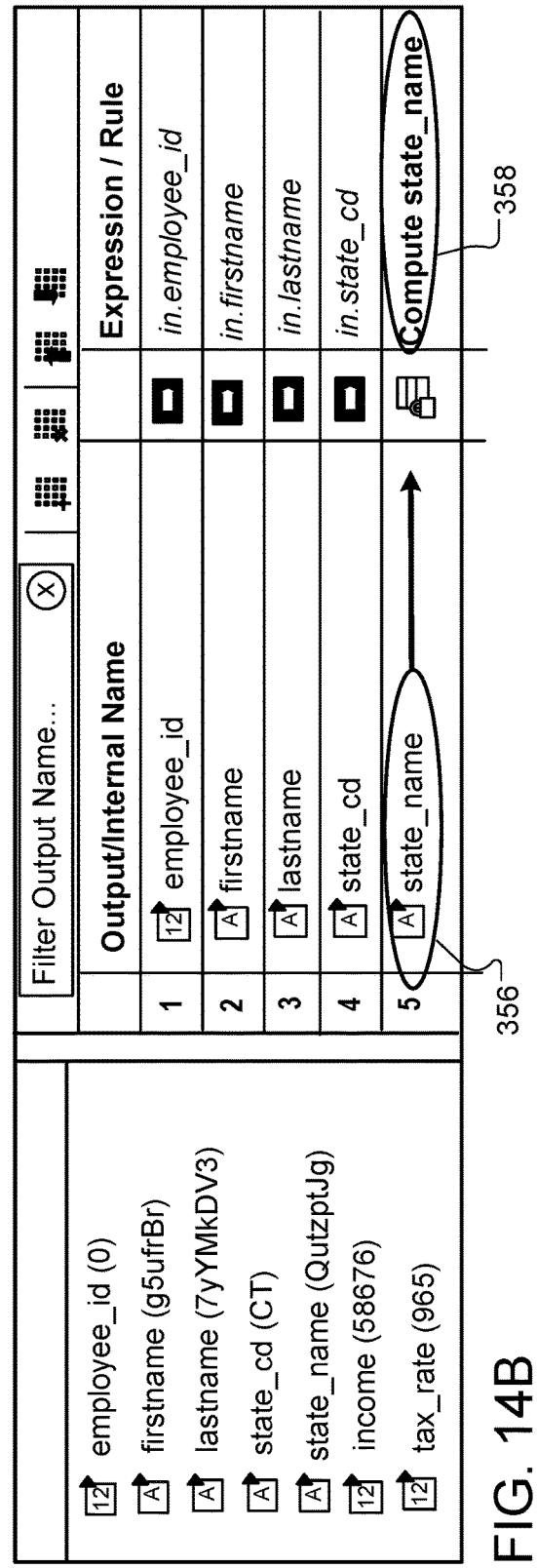
FIG. 14A
FIG. 14B

Rule: Compute state_name

| | Trigger (Only the first true case will fire) | Output |
|---|---|---|
| | ▷ state_cd (CT) | ▷ state_name (Connecticut) |
| 1 | "CT" | "Connecticut" |
| 2 | "MA" | "Massachusetts" |
| 3 | "RI" | "Rhode Island" |
| 4 | "ME" | "Main" |
| 5 | "VT" | "Vermont" |
| 6 | "NH" | "New Hampshire" |
| * | *any* | Auto Map: state_name |

Rule: Compute state_rate

| | Trigger (Only the first true case will fire) | Output |
|---|---|---|
| | ▷ income | ▷ tax_ rate |
| 1 | < 8925 | 10 |
| 2 | < 36250 | 15 |
| 3 | < 87850 | 25 |
| 4 | < 183250 | 28 |
| 5 | < 398350 | 33 |
| 6 | < 400000 | 35 |
| * | any | Default Variable Expression: 39.6 |

| Inputs | | | | | |
|---|---|---|---|---|---|
| 12 employee_id (1) | | | | | |
| A firstname (agFMdsxa) | Filter Output Name... ⊗ | | | | |
| A state_cd (RI) | Output/Internal Name | | Expression / Rule | | Computed Value |
| A state_name (Rhode Island) | 1 | 12 employee_id | | in.employee_id | 1 |
| 12 income (460983) | 2 | A firstname ←554 | | firstname + " " lastname ←552 | Jackie Norris |
| 12 tax_rate (39.6) | 3 | A state_cd | | in.state_cd | RI |
| A ssn (573-05-3583) | 4 | A state_name | | in.state_name | Rhode Island |
| ▶ E _xx_source_dml | 5 | 12 income | | in.income | 460983 |
| 556⌐ 12 employee_id (1) | 6 | 12 tax_rate | | in.tax_rate | 39.6 |
| A firstname (Jackie) | 7 | A ssn | | in.ssn | 573-05-3583 |
| 558⌐ A lastname (Norris) | * | + Add new Internal | | | |
| A state_cd (RI) | | | | | |
| A state_name (Rhode Island) | | | | | |
| 12 income (460983) | | | | | |
| 12 tax_rate (39.6) | | | | | |
| A ssn (573-05-3583) | | | | | |

DATA GENERATION

CLAIM OF PRIORITY

This application is a continuation of U.S. patent application Ser. No. 14/573,038, filed on Dec. 17, 2014, which claims priority to U.S. Patent Application Ser. No. 61/917,727, filed on Dec. 18, 2013, the entire contents of both of which are incorporated herein by reference.

BACKGROUND

This description relates to data generation.

During development of data processing applications, developers can work outside of a production environment and may not have access to production data. To ensure that a data processing application will run correctly in production with actual data, realistic data can be used during development and testing of the data processing application.

SUMMARY

In a general aspect, a method includes receiving data indicative of a number of times each of one or more rules was executed by a data processing application during processing of one or more records; based on the number of times each of the rules was executed by the data processing application, determining a content criterion for each of one or more particular fields; generating content for each of the particular fields based on the content criterion; and populating each of the particular fields with the generated content.

Embodiments may include one or more of the following features.

Generating content includes generating content based on a format specification for each of the particular fields. The format specification includes a type of content, including one or more of a string, a decimal, an integer, a date, or a datetime. The method includes receiving the format specification through a user interface.

The method includes creating a new record including one or more of the particular fields; and populating the particular fields for the new record.

Populating each of the particular fields with the generated content includes modifying pre-existing content for one or more of the particular fields.

Populating each of the fields includes creating the particular field for one or more pre-existing records.

The content criterion includes one or more of a target value, a target range of values, a target distribution of values, a maximum value, or a minimum value.

The content criterion includes particular values for the generated content.

The content criterion is indicative of a target combination of content to be included in two or more of the one or more fields.

The method includes receiving the content criterion through a user interface.

Generating content includes generating content based on a generation mode.

The generation mode includes one or more of (i) generation of random content for one or more of the fields for each of multiple records, (ii) generation of unique content for one or more of the fields for each of multiple records, and (iii) selection of content for one or more of the fields for each of multiple records from a set of available content.

The method includes providing one or more records including the generated content to the data processing application.

The content criterion is determined to cause a particular rule to be executed by the data processing application.

Determining the content criterion includes identifying a particular rule that was executed less than a minimum threshold number of times; and determining the content criterion to cause the particular rule to be executed at least the minimum threshold number of times.

The format specification includes a type of content.

In a general aspect, a method includes receiving, through a user interface, a format specification; receiving, through a user interface, a content criterion; receiving, through a user interface, an indication of a mode by which content is to be generated; generating content according to the indicated mode, wherein the generated content satisfies the format specification and content criterion; and creating a field in a record, the field including the generated content.

Embodiments may include one or more of the following features.

The mode includes one or more of (i) generation of random content for each of multiple records, (ii) generation of unique content for each of multiple records, and (iii) selection of content for each of multiple records from a set of available content.

Receiving the content criterion includes receiving a selection of the content criterion from one or more content criteria displayed on the user interface.

Receiving the format specification includes receiving a selection of the format specification from one or more format specifications displayed on the user interface.

The format specification indicates a type of content, such as one or more of a string, a decimal, an integer, a date, or a datetime.

The content criterion indicates one or more of a maximum value for the content, a minimum value for the content, and a range of values for the content.

The content criterion indicates particular values for the content.

The content criterion indicates a target distribution for the content.

The content criterion is indicative of a target combination of content to be included in two or more fields.

Receiving the indication of the content generation mode includes receiving a selection of the content generation mode from one or more content generation modes displayed on the user interface.

The method includes creating a new record. Creating a field in a record includes creating a field in the new record.

The method includes receiving a second format specification, a second content criterion, and an indication of a second mode; generating second content according to the indicated second mode, wherein the generated content satisfies the second format specification and the second content criterion; and replacing the content for an existing field in the record with the generated second content.

In a general aspect, a non-transitory computer readable medium stores instructions for causing a computer system to, based on a number of times each of one or more rules was executed by a data processing application during processing of one or more records, determine a content criterion for each of one or more fields; generate content for each of the fields based on the content criterion; and populate each of the fields in one or more records with the generated content.

In a general aspect, a computing system includes at least one processor configured to, based on a number of times each of one or more rules was executed by a data processing application during processing of one or more records, determine a content criterion for each of one or more fields; generate content for each of the fields based on the content criterion; and populate each of the fields in one or more records with the generated content.

In a general aspect, a computing system includes means for, based on a number of times each of one or more rules was executed by a data processing application during processing of one or more records, determining a content criterion for each of one or more fields; means for generating content for each of the fields based on the content criterion; and means for populating each of the fields in one or more records with the generated content.

In a general aspect, a method for testing a data processing application during development of the data processing application includes processing first data records using the data processing application, the data processing application implementing one or more rules. Each first data record has multiple fields. The method includes comparing a number of times each rule of the data processing application is executed during processing of the first data records with a target value for the rule. The method includes based on the results of the comparing, determining a content criterion indicative of a target characteristic for data in second data records to be processed using the data processing application. The method includes generating content for one or more fields of the second data records according to a format of the first data records and according to the content criterion; processing the second data records using the data processing application; comparing a number of times each rule of the data processing application is executed during processing of the second data records with the target value for the rule and determining that the target value for each rule is satisfied; and testing the data processing application using the second data records.

Embodiments can include one or more of the following features.

The method includes receiving the first data records at a client device, wherein the data processing application is executed on the client device. The client device comprises a computing device.

The method includes receiving the first data records from a remove server. The method includes receiving the first data records at a client device that is communicatively coupled to a server via a LAN or WAN connection The method includes determining the content criterion such that the data in the second data records causes the target value for each rule to be satisfied when the data processing application processes the second data records.

Generating content for one or more fields of the second data records includes modifying content in one or more fields of the first data records, and wherein the modified first data records are the second data records.

Generating content for one or more fields of the second data records includes creating a new data record.

The method includes storing the second data records in a storage device.

The method includes modifying the data processing application based on a result of the testing.

Testing the data processing application includes modifying the data processing application based on a result of processing the second data records using the data processing application.

The method includes determining the content criterion such that the data in the second data records is substantially similar to data expected to be processed by the data processing application in a production environment.

Aspects can include one or more of the following advantages. Data can be generated according to arbitrary format specifications and content criteria, e.g., through a straightforward user interface. Data generation can be used to supplement existing data, e.g., if an existing data set does not have enough records or does not have records with desired characteristics. Data generation can also be used to generate data from scratch, e.g., if an application calls for data that is not available.

In some examples, realistic data can be generated for testing of a data processing application. For instance, a set of test data can be generated that causes all of the rules of the data processing application to execute at least once, e.g., that triggers every possible action in the data processing application. If such data do not exist, the data can be generated. For instance, once a complete set of data is generated, the generated set of data can be processed by the data processing application to test the execution of the data processing application. Because the generated set of data causes every possible action in the data processing application to be executed, the data processing application can be thoroughly tested. If the data processing application does not perform as expected (e.g., if an action of the data processing application does not perform as expected), the data processing application can be modified as appropriate and tested until satisfactory results are achieved.

Other features and advantages of the invention will become apparent from the following description, and from the claims.

DESCRIPTION OF DRAWINGS

FIG. 1 is a block diagram of a system for data generation.
FIG. 2 is a block diagram of a data generation module.
FIG. 3A is a portion of an example source file.
FIGS. 3B-3D are portions of example target files.
FIG. 8 is a record format window.
FIGS. 14A-14C are windows for rule creation.
FIGS. 15A-15C are windows for rule creation.
FIG. 16 is a window for rule creation.

DESCRIPTION

Figure 4:
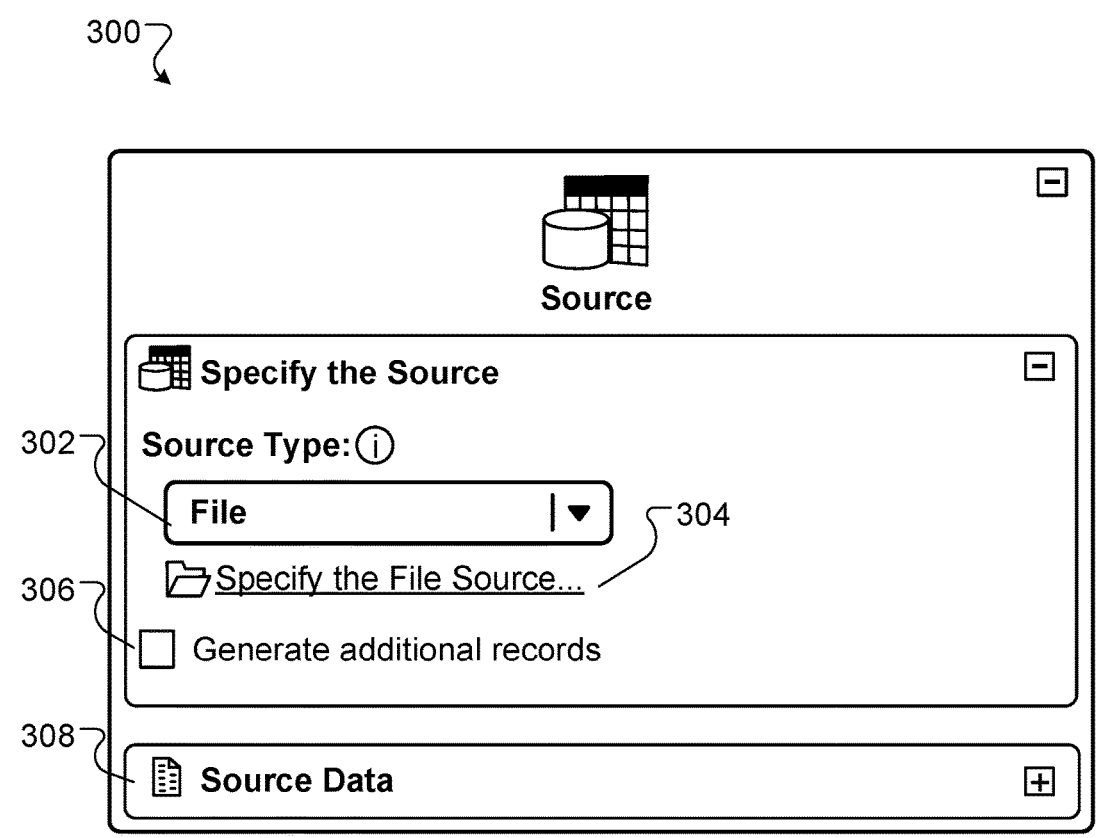
FIG. 4 is a source window.

We describe here a general approach to generating data according to various configurable options. For instance, the data type of the generated data can be specified by a user. The data types can include, e.g., string, decimal, integer, date, and datetime. The generated data can satisfy one or more configurable content criteria that impose limits on characteristics of the generated data, such as, e.g., a range of allowed values for generated decimal or integer data, an average string length for generated string data, a set of values or characters that can be used in the generated data, and other characteristics. Data generation can include modifying values in one or more fields of existing source records, augmenting source records by creating and populating new fields in the records, or creating entirely new records. In some examples, the configurable options can be specified by a user through a user interface.

In some examples, a set of records can be processed by a data processing application. Data processing applications can implement rules whose execution depends on the value of one or more variables, such as depending on the input records. In some cases, data can be generated for the set of records to cause a desired execution result when the data processing application processes the set of records. For instance, data can be generated for the set of records that will cause a particular rule in the data processing application to execute, to cause a particular rule to be executed more or fewer times, or to cause another desired execution result. Based on a result of executing the application, a determination can be made as to what data are to be generated, e.g., to better achieve the desired execution result. For instance, a set of realistic data can be generated that is substantially similar to production data that is expected to be processed by the data processing application. The generated set of realistic data can be used to test the data processing application, e.g., to ensure that all aspects of the data processing application operate correctly. Based on the results of the testing, the data processing application can be modified, if appropriate, prior to use in a production environment.

FIG. 1 shows an exemplary data processing system 100 in which the data generation techniques can be used. The system 100 includes a source 102 that may include one or more sources of data such as storage devices or connections to online data streams, each of which may store or provide data in any of a variety of formats (e.g., database tables, spreadsheet files, flat text files, or a native format used by a mainframe). An execution environment 104 includes an execution module 112. The execution environment 104 may be hosted, for example, on one or more general-purpose computers under the control of a suitable operating system, such as a version of the UNIX operating system. For example, the execution environment 104 can include a multiple-node parallel computing environment including a configuration of computer systems using multiple central processing units (CPUs) or processor cores, either local (e.g., multiprocessor systems such as symmetric multi-processing (SMP) computers), or locally distributed (e.g., multiple processors coupled as clusters or massively parallel processing (MPP) systems), or remote, or remotely distributed (e.g., multiple processors coupled via a local area network (LAN) and/or wide-area network (WAN)), or any combination thereof.

The source 102 includes storages devices that may be local to the execution environment 104, for example, a storage medium connected to a computer hosting the execution environment 104 (e.g., hard drive 108), or may be remote to the execution environment 104, for example, being hosted on a remote system (e.g., mainframe 110) in communication with a computer hosting the execution environment 104, over a remote connection (e.g., provided by a cloud computing infrastructure).

The execution module 112 reads and processes data read from the source 102. The execution module 112 includes one or more data processing applications that execute processes, such as computations, on the data. The output data 114 may bestored back in the source 102 or in a data storage system 116 accessible to the execution environment 104, or otherwise used.

The data storage system 116 is also accessible to a development environment 118 in which a developer 120 is able to configure the data processing applications, sources 102, or both. The development environment 118 is, in some implementations, a system for developing applications as dataflow graphs that include vertices (representing data processing components or datasets) connected by directed links (representing flows of work elements, i.e., data) between the vertices. For example, such an environment is described in more detail in U.S. Publication No. 2007/0011668, titled "Managing Parameters for Graph-Based Applications," incorporated herein by reference. A system for executing such graph-based computations is described in U.S. Pat. No. 5,966,072, titled "EXECUTING COMPUTATIONS EXPRESSED AS GRAPHS." Dataflow graphs made in accordance with the system 100 provide methods for getting information into and out of individual processes represented by graph components, for moving information between the processes, and for defining a running order for the processes. The system 100 includes algorithms that choose interprocess communication methods from any available methods (for example, communication paths according to the links of the graph can use TCP/IP or UNIX domain sockets, or use shared memory to pass data between the processes).

A data generation module 150 can generate data for processing by the execution module. The data generation module 150 can modify or augment existing data, such as data from the source 102. For instance, the data generation module 150 can modify values for one or more fields in source data records or can create and populate one or more new fields in the source data records. The data generation module 150 can also generate entirely new data records, e.g., based on a format of the source data records or based on a specified format.

Referring to FIG. 2, the data generation module 150 includes a data generation engine 20 that generates data to be stored in a target 24. In some examples, the data generation engine 20 can generate data based on the data in a data source 22. In some examples, the data generation engine 20 can generate data from scratch, i.e., without source data. The data source 22 can be a file, a database, or a parameter set, or another source of data. The data source 22 can include one or more records, each having one or more fields of data. For instance, an example data source can be a database storing customer records for customers of a retail store (which we refer to here as the "customer database"). Each record in the database represents an individual customer. Each record can have multiple fields. The data source 22 can have a record format that specifies the format of the records, such as the number of fields, the type of data in each field (e.g., string, integer, decimal, date, or datetime), and characteristics of the data in each field (e.g., an allowed range of values, a maximum allowed value, a list of allowed characters, or other limitations). In some examples, data is generated from scratch and no data source is provided.

For instance, referring to FIG. 3A, a portion of an example source file 200 includes six records 202, each record having the following fields: a cust_ID field 204, a name field 206, a cust_age field 208, and a state field 210.

Referring again to FIG. 2, in some examples, the data source 22 can be identified by a user 26. For instance, a user interface engine 28 of the data generation module 150 can enable a user interface 30 to be displayed to the user 26, e.g., on a display interface of a computing device 32, such as a personal computer or a mobile computing device. The user 26 can identify the data source 22 through the user interface 30. The generated data can be stored in the target 24, such as a file, a database, a parameter set, or another data structure. In some examples, the target file 24 can be identified by the user 26, e.g., through the user interface 30. In some cases, the record format of the target can match the record format of the source. That is, a record format that is specified for the target can be the same as the record format of the existing records in the source. In some cases, the record format of the target differs from the record format of the source, and some or all of the record formats of the source can be mapped to the target. For instance, the format of one or more fields of the source can be included in the record format of the target.

The data generation module 150 can generate data for the target 24 based on configuration data 34, e.g., stored in a database 36, a file, or another data structure. The configuration data 34 can specify a data generation approach to be used for the target 24, a content generation mode for the target 24, a data type of the data to be generated for the target 24, content criteria for the data to be generated for the target, and other configuration information for the data to be generated for the target 24. These configuration data 34 are discussed in greater detail below. In some cases, some or all of the configuration data 34 used to generate the data for the target 24 can be specified by the user 26, e.g., through the user interface 30. In some examples, some or all of the configuration data 34 can be determined by a configuration engine 39, for instance, based on an analysis of the data source 22 or based on information about desired properties of the target.

In some examples, the data generation engine 20 can generate data for the target 24 by modifying values for one or more of the fields of existing source records in the data source 22 according to the configuration data 34. The modified records can be stored in the target 24. In some cases, all of the values for a given field can be modified. For instance, a value can be assigned to a given field for each record such that the distribution of values in the given field across all of the records matches a target distribution as indicated by the configuration data 34. For instance, the distribution can be specified by the user 26 or determined by the configuration engine 39. In some cases, fewer than all of the values for a given field can be modified, such as only values that do not meet a specified criterion as indicated by the configuration data 34. For instance, any values for a given field that fall outside of a particular range of allowed values for that field can be modified.

For instance, referring to FIG. 3B, a portion of an example target file 220 includes records 222 generated based on the source file 200. In this example, the configuration data 34 (FIG. 2) indicate that the cust_age field 208 can have a maximum value of 40. To satisfy the criterion specified by the configuration data 34, the values for the cust_age field 208 in the source file 200 were modified by the data generation engine 20 such that the maximum value for the cust_age field was 40. That is, the value for the cust_age field 208 for the particular record 222a was modified from 45 (in the source file 200) to 25 (in the target file 220). Values for the other fields of the generated records 222 of the target file correspond to the values in the source records 202.

Referring again to FIG. 2, in some examples, the data generation engine 20 can generate data by augmenting the existing source records of the data source 22 with one or more new fields according to the configuration data 34. The augmented records (i.e., the records with the one or more new fields) can be stored in the target 24. The configuration data 34 can provide instructions for determining the number of new fields, the data types and values for the new fields, and other characteristics of the new fields. In some cases, the configuration data 34 can specify that values for a new field are to be generated based on the data for an existing field in the source data of the data source 22. In some cases, the configuration data 34 can specify that values for a new field are to be generated from scratch, e.g., according to specified characteristics (e.g., characteristics specified by the configuration data 34) but not based on any existing source data.

For instance, referring to FIG. 3C, a portion of an example target file 230 includes records 232 generated based on the source file 200. In this example, the configuration data 34 (FIG. 2) specify the creation of a new age_range field 234 that has values that are generated by classifying the value for the cust_age field 208 into one of five available age_range buckets. The configuration data 34 further specify the creation of a new cust_income field 236 with values subject to specified maximum and minimum values but without any relationship to the data in the source file 200.

Referring again to FIG. 2, in some examples, the data generation engine can generate data by augmenting the existing source records of the data source 22 with one or more new records according to the configuration data 34. The augmented records (i.e., both the existing source records and the new records) can be stored in the target 24. The new records can have the same record format as the source records. The configuration data 34 can provide instructions for determining the number of new records, the values for the fields of the new records, and other characteristics of the new records. In some cases, the configuration data 34 can specify that values for one or more fields in the new records are to be generated from scratch, e.g., according to specified characteristics, but not based on any existing source data of the data source 22. In some cases, the configuration data 34 can specify that values for one or more fields in the new records are to be generated to satisfy a profile specified by the configuration data 34. For instance, the profile can specify that the values for a particular field in all of the records satisfy a characteristic, such as an average or a distribution. For instance, in the customer database source, new records can be generated such that the values for the cust_age field across all of the records satisfy a particular distribution specified by the configuration data 34.

For instance, referring to FIG. 3D, a portion of an example target file 240 includes records 202, 242 generated based on the source file 200. In this example, the configuration data 34 (FIG. 2) specify the creation of four new records 242 such that the values for the cust_age field 208 across all of the records have an average value between 40 and 45, subject to a maximum value of 60 for the field. In this example, the configuration data 34 specify that the values for each other field are to be randomly generated, e.g., according to specified characteristics for the field. The original source records 202 are also included in the target file 240.

In some examples, the data generation engine 20 can apply more than one approach to data generation, according to the configuration data 34. For instance, the data generation engine 20 can apply any combination of the following approaches: the values for one or more fields can be modified, the source records can be augmented with one or more new fields, and the source records can be augmented with one or more new records.

In some examples, only generated records are stored in the target, such as a file, a database, or a parameter set, and the source records (if any) are not stored in the target. In some cases, a source can be specified, e.g., by a user, and the generated records can be generated by the data generation engine 20 module based on the record format of the source, a profile of one or more fields of the source, or another characteristic of the source. In some cases, no source is specified and the records are generated automatically from scratch by the data generation engine 20 according to the configuration data 34. For instance, the record format and the characteristics of one or more fields can be specified by the configuration data 34.

In some examples, the record format of the source can be mapped to the target. For instance, the configuration data 34 can indicate that the record format of the source is to be adopted by the target. For instance, the record format of the source can be applied to the target according to the configuration data 34 and new records can be generated from scratch by the data generation engine 20 according to the record format of the source. In some cases, data can be generated from multiple sources, and the record format of each source can be partially or completely mapped to the target. For instance, the format of fields of interest from each source can be mapped to the target.

In some examples, the record format of the source can be mapped to the target and modified. For instance, the configuration data 34 can specify that the name of a field is to be changed from the source to the target, or that a field from the source is to be removed.

Referring to FIG. 4, the data generation module 150 provides a user interface (e.g., the user interface 30 of FIG. 2) that provides a source window 300 to enable a user to identify the data source. The source window 300 includes a source type menu 302 that allows the user to specify a source type, such as a file or a database. In the example of FIG. 4, the source is a file. The source window 300 enables the user to specify an identifier 304 of the source, such as a path to the source (e.g., a path to a file source or a path to a configuration file for a database source) and an identifier of a record format of the source records (e.g., a path to a record format file). In some examples, when the source is a database, the user can specify a query (e.g., a SQL query) that is to be used to obtain source data from the database. The source window 300 provides an option to allow the user to indicate whether new records 306 are to be generated, and if so, the number of new records to be generated. The source window 300 enables the user to view other information 308 about the source. For instance, the user can view the record format of the source, view the source data, or view a profile of the source data. In some examples, an executable application, such as a dataflow graph, can be used to generate source data.

Figure 5A:
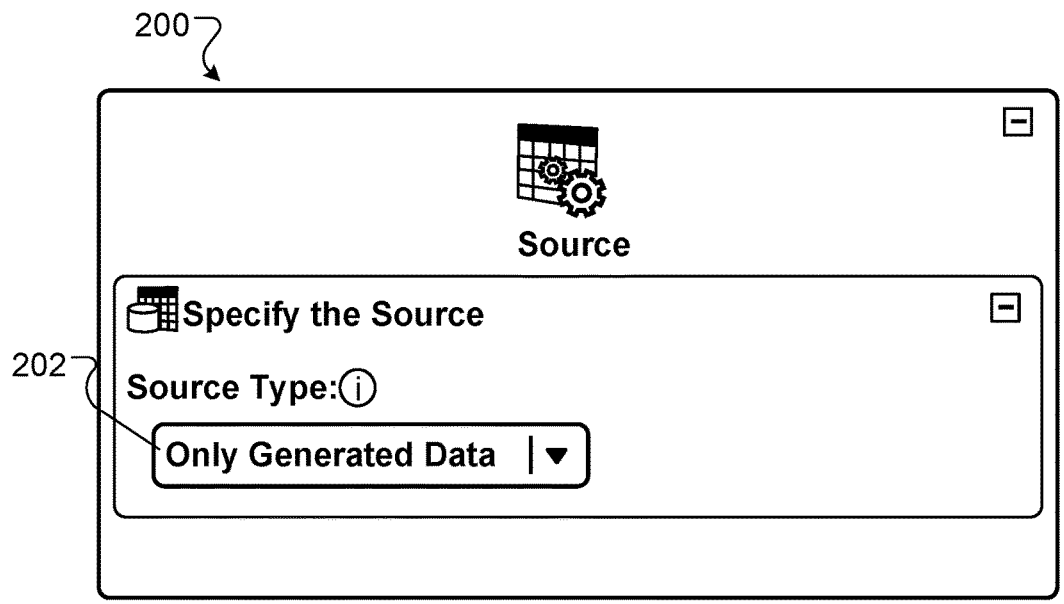
FIG. 5A is a source window.
Figure 5B:
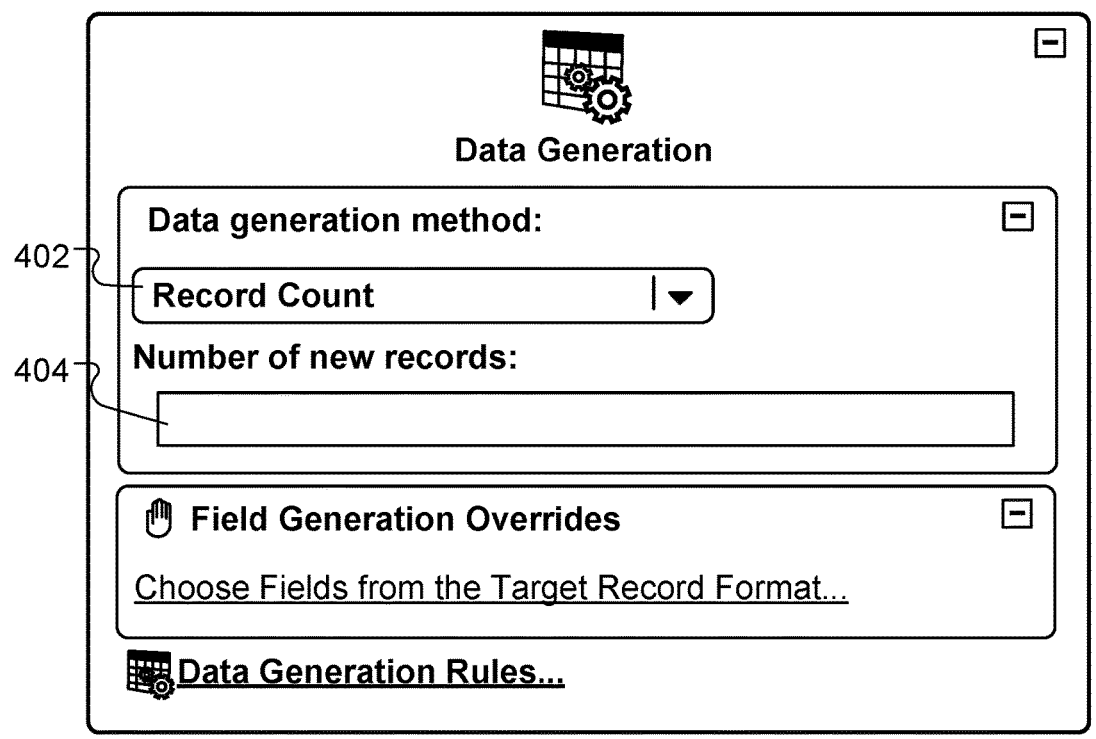
FIG. 5B is a data generation window.

Referring to FIGS. 5A and 5B, in some examples, the source window 300 of the user interface 30 allows the user to specify that data is to be generated from scratch without specifying a source. In particular, the source window 300 enables the user to select generated data as the source type in the source type menu 302. If the user selects generated data as the source type, a data generation window 400 is displayed in the user interface 30. The data generation window 400 enables the user to indicate a method 402 to be used to generate the data (discussed below) and indicate a number of new records 404 to be generated. In some examples, default data generation characteristics, such as a default data generation mode or default values that are specified in the record format of the target can be used to generate data from scratch unless the user overrides the default. For instance, a field generation overrides option 406 allows the user to specify data generation characteristics for one or more fields in the target. In some examples, a rules option 408 allows the user to create more complex data generation rules for individual fields.

Figure 6:
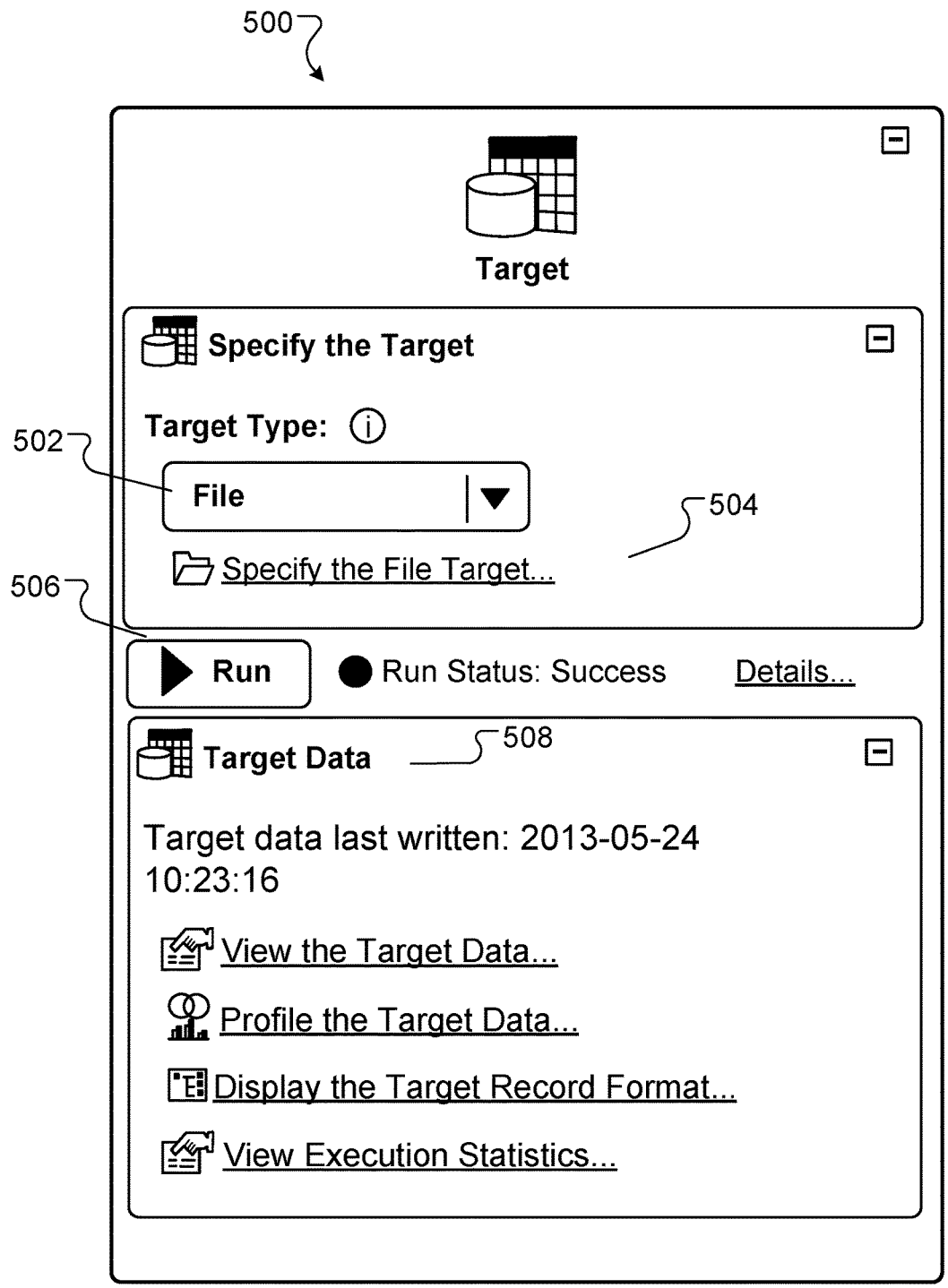
FIG. 6 is a target window.

Referring to FIG. 6, the user interface 30 provides a target window 500 that enables the user identify the target. A target type menu 502 in the target window 500 enables the user to specify the type of the target, such as a file or database. The target window 500 also enables the user to specify an identifier 504 of the target (e.g., a path to a target file or a path to a configuration file for a target database). In some examples, the record format of the source is used as the record format for the target unless a different record format is specified, e.g., through the target window 500. For instance, if data is generated from scratch without a source, a record format file can be identified through the target window that specifies the record format for the target. In some examples, an executable application, such as a dataflow graph, can be used to write the generated data to the target. The target window 500 provides a run button 506 that provides the user with access to various configurable options for data generation once the source and target have been identified. The target window 500 also enables the user to view other information 508 about the source. For instance, the user can view the target data set, view a profile of the target data set, or view the record format of the target. In some examples, the target window provides access to statistics associated with the generation of data for the target, such as the number of records read from the source and/or written to the target, the number of records generated, or other statistics.

The data generation engine 20 provides several approaches to generate data. A data generation window of the user interface 30 enables the user to specify the desired data generation approach. For instance, field modification, field creation, record creation, existing source, and parent dataset approaches can be used to generate data.

Field modification: In a field modification approach, the values for one or more fields of the source records can be modified, such that the target data records have the same format as the source data records but different content. In some cases, all of the values for a given field can be modified. For instance, values can be assigned such that the distribution of values in a given field across all of the records matches a target distribution. In some cases, fewer than all of the values for a given field can be modified, such as only values that do not meet a specified criterion. For instance, any values that fall outside of a particular range of allowed values for a particular field can be modified.

Field creation: In a field creation approach, one or more new fields can be created for existing records. In some cases, values for a new field can be generated based on the data for an existing field in the source data. In some cases, values for a new field can be generated from scratch, e.g., according to specified characteristics but not based on any existing source data.

Record creation: In a record creation approach, new records can be generated. When new records are to be generated, the number of records to be generated can be specified (e.g., as in FIG. 5B). In some cases, the record format of the new records can be specified. For instance, if the target is to be populated with both existing source records and newly generated records, the record format of the new records can be the same as the record format of the source records. If the target is to be populated with only newly generated records, the user can specify the record format to be applied to the generated records, such as the number of fields, the type of data for each field, the characteristics of the data for each field (e.g., a maximum value, a minimum value, a set of allowed characters, and other characteristics), and other features of the record format.

Figure 7:
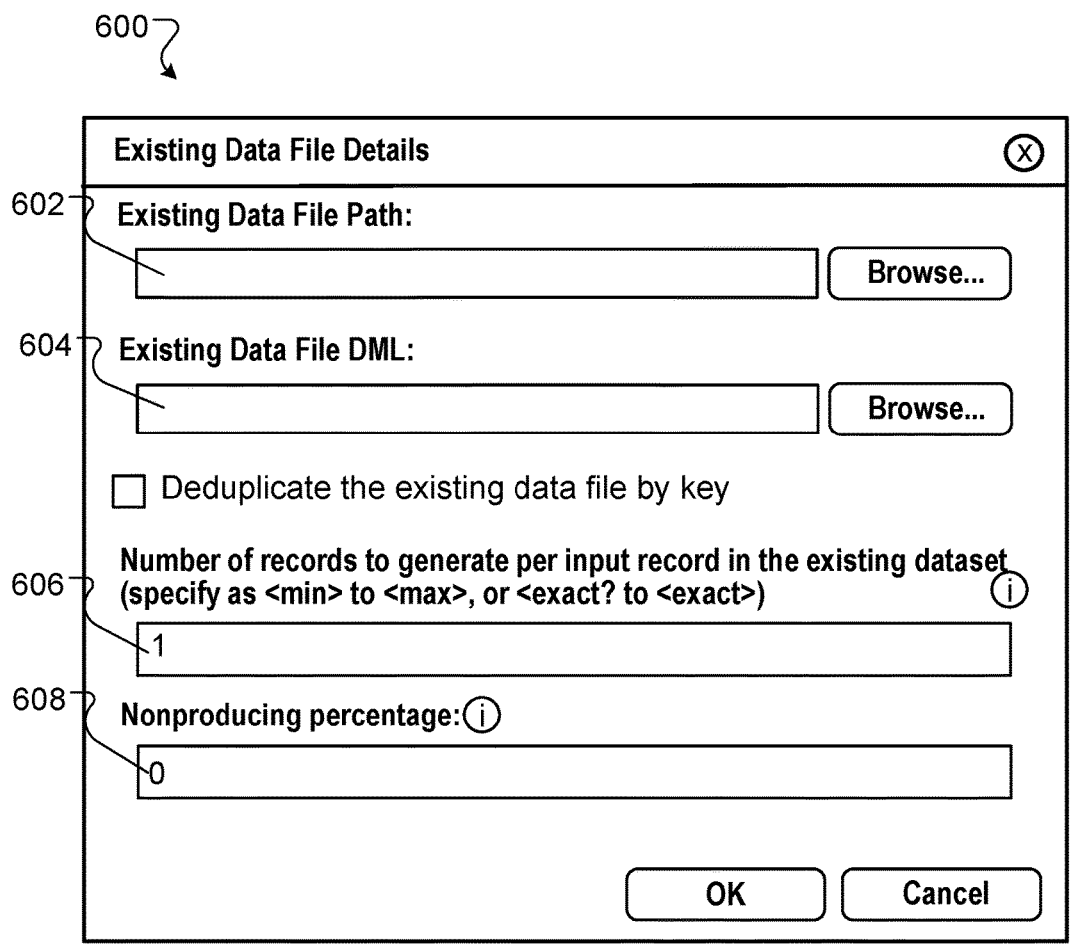
FIG. 7 is an auxiliary source window.

Existing dataset: In an existing dataset approach, data is generated for a newly created child dataset. For instance, based on an existing customer dataset, a new dataset including transaction records can be generated. In the existing dataset approach, a specified number of new records are generated for each existing source record. For instance, referring to FIG. 7, an existing dataset window 600 allows a user to specify a path 602 or data manipulation language (DML) 604 of the source dataset, a number 606 of target records to be generated per data record in the existing source dataset, and a percentage of source records that are not to be used to generate records in the target. In some examples, an auxiliary source can contain data to be used to populate certain fields of target records but can have a record format that does not match the record format of either the source or the target. In such cases, one or more fields of interest from the auxiliary source can be mapped to the target records.

Subject-area approach: In a subject area approach, an existing source dataset can be a parent dataset in a subject-area hierarchy, and generating data can include generating a child dataset that is related to the parent dataset. For instance, the parent dataset (i.e., the source) can be a set of customer records and the child dataset (i.e., the target) can be a set of one or more transaction records for each customer. A key field can be specified that links records in the child dataset to corresponding records in the parent set, and one or more key fields of the parent data records are mapped to corresponding fields in the generated child data records. For instance, the cust_ID field can be the key field linking customer records and transaction records. The number of child records to be generated per key field can be specified. In some cases, the percentage of parent records that are not to be used to generate child records can be specified. In some cases, the record format for the child records can be specified.

In some examples, data can be generated according to a format specification, a content criterion, or both. A format specification is a specification of the format of the data to be generated. For instance, the format specification can indicate the data type (e.g., string, decimal, integer, date, or datetime) of the data to be generated. The content criterion is a criterion that limits the characteristics of the data to be generated. Example content criteria can include, e.g., an allowed range of values, a maximum allowed value, a list of allowed characters, or other content criteria. In some examples, the format specification and the content criterion are specified in the record format of the target records. In some examples, the user interface 30 can provide field windows that enable the user to specify characteristics of a field, such as a format specification or a content criterion for the field.

Referring to FIG. 8, a record format window 700 of the user interface enables a user to edit the target record format, including the data type and the data characteristics for one or more fields of the target. The record format window 700 displays a list 702 of the fields that are in the record format of the target. The list 702 also indicates the data type for each field. In some examples, fields that are in the record format of the target also appear in the record format of the data source. Those fields that appear in both the target record format and the source record format can be marked in the list 702, e.g., with asterisks (i.e., ). For instance, in the example of FIG. 8, the fields last_transaction and customer_since appear in both the target record format and the source record format. The fields that are not marked appear only in the target record format. In some examples, fields that appear in the source record format but not in the target record format are not displayed in the list 702**.

The record format window 700 enables a user to select one or more fields of the target record format for which to specify data generation characteristics, e.g., by clicking on, tapping on, or dragging the name of the desired fields. A list 704 of the selected fields of the target record format is displayed. That is, the fields in the list 704 are those fields of the target record format for which the user intends to specify data generation characteristics. In some examples, the list 704 can be a subset of the list 702 of all of the fields in the target record format, e.g., if the user intends to specify data generation characteristics for only some of the fields of the target record format. For instance, in the example of FIG. 8, the fields custid, fname, lname, and building_num have been selected.

The user interface 30 enables a user to edit the record format for each of the selected fields displayed in the list 704. For instance, for each of the selected fields, the user can perform any combination of designating the data type for the field, assigning a content generation mode to the field, and specifying data characteristics for the field. The user interface can display one or more of a data type window, a content generation window, and a data characteristics window for each of the selected fields in turn, thus enabling the user to specify various features for each of the selected fields.

The user interface 30 enables the user to designate a data type for the field. A data type window can be displayed in the user interface 30 responsive to user selection of a particular field from the list 704 to enable the user to designate a data type for that field. The user can designate any arbitrary data type that is supported by the data generation module 150, such as strings, decimals, integers, dates, and datetimes (i.e., a date and a time). One data type can be designated for each field. In some cases, if a data type is not designated for a given field, the data type indicated by the record format for that field is retained. For instance, in the example of FIG. 8, the data type of each of the fields as indicated by the record format for the field is shown in parenthesis next to the field name. The data type designated for each field of the target record format can be stored as configuration data 34.

The user interface 30 enables the user to assign a content generation mode to one or more of the selected fields. A content generation window can be displayed in the user interface 30 responsive to user selection of a particular field from the list 704 to enable the user to assign a content generation mode to that field. The content generation mode for a field indicates the way in which data is to be generated for the field by the data generation engine 20. For instance, example content generation modes can include unique mode, random mode, default mode, and list mode. In unique mode, a unique value can be generated for the selected field in each record. For instance, an ascending set of unique decimal, string, or integer values can be generated. Date values can be generated ascending by day from a default or specified date basis, such as 19000101 or another date basis. Datetime values can be generated ascending by minute from a default or specified datetime basis, such as the current date and time. In random mode, a random value can be generated for the selected field in each record. In default mode, default characteristics or default values that are specified in the record format of the target can be used to generate values. For instance, in some examples, the default data generation mode can be random mode, and default value ranges and characteristics can apply to each data type. In list mode, values are selected from a list of allowed values. In some cases, if a content generation mode is not assigned for a given field, the default mode can be used to generate data for that field or a default value (e.g., as specified in the record format of the target records) can be used as the value for the field. In some examples, the content generation mode for one or more fields can be specified in the record format of the target records. The content generation mode for each field of the target record format can be stored as configuration data 34.

If unique mode, random mode, or default mode data generation is assigned to a field, the user interface 30 enables the user to specify data characteristics for one or more of the selected fields. The data characteristics can depend on the data type for the field and can limit the allowable values that can be generated for the field. For instance, data characteristics for a numerical field, such as a decimal field or an integer field can indicate a maximum allowed value, a minimum allowed value, an allowed range of values, or an average value for the field across all records. Other data characteristics can also be applied, as discussed below. In some examples, a field error rate (i.e., a number or percentage of records to contain errors) can also be specified for one or more fields. To enable data characteristics to be specified for a particular field, a characteristics window that is specific to the data type of that field is displayed in the user interface 30 responsive to user selection of that field from the list 704. For instance, a string characteristics window, a decimal characteristics window, an integer characteristics window, a date characteristics window, or a datetime characteristics window, or a window for another data type can be displayed in the user interface 30. The data characteristics for each field of the target record format can be stored as configuration data 34.

Figure 9:
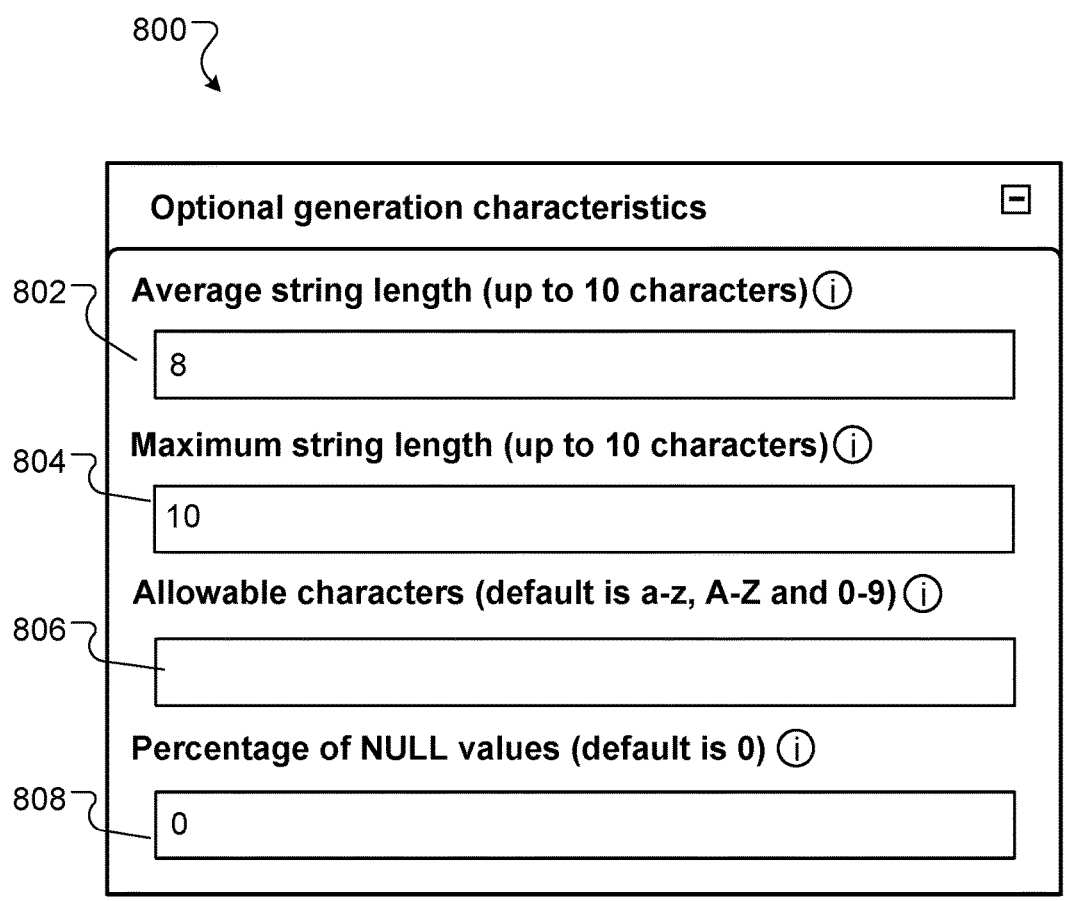
FIG. 9 is a string characteristics window.

Referring to FIG. 9, a string characteristics window 800 allows the user to specify data characteristics for a string field. In the example of FIG. 9, the data characteristics include an average string length 802, a maximum string length 804, and a set of allowable characters 806 for the particular string field. The user can also specify a percentage of NULL values 808 for the particular string field. In some cases, other data characteristics can also be specified. In some examples, if the user does not specify one or more of the data characteristics for a string field, a default value for the data characteristic can apply. For instance, the default average string length 802 can be 8; the default maximum string length 804 can be 16; the default set of allowable characters 806 can include the characters {a-z, A-Z, 0-9, and space}; and the default percentage of NULL 808 values can be zero.

In one particular example, a user specified the average string length 802 as 4 characters, the maximum string length 804 as 8 characters, the set of allowed characters 806 as {a-z, A-Z}, and the percentage of NULL values 808 as zero for a particular field. In this example, if the user assigned random mode data generation to the particular field, a random string would be generated for that field for each record from the set of allowable characters, subject to the specified average length and maximum length. If the user assigned unique mode data generation to the particular field, a unique string would be generated for that field for each record (i.e., such that no two records would have the same generated string for the particular field).

Figure 10:
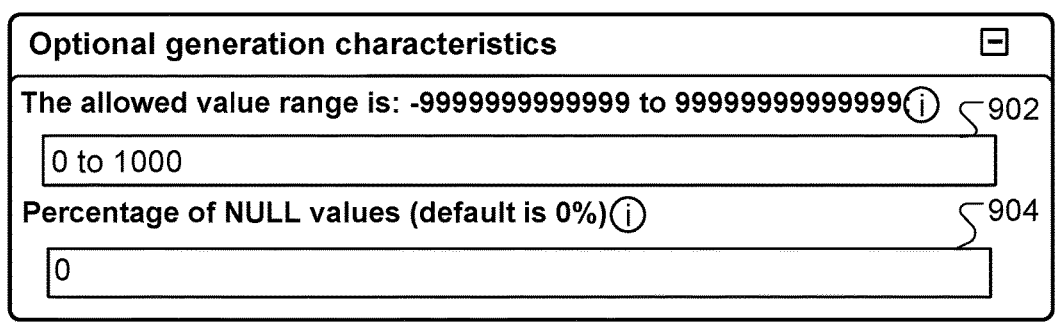
FIG. 10 is a decimal characteristics window.

Referring to FIG. 10, a decimal characteristics window 900 allows the user to specify data characteristics for a decimal field. In the example of FIG. 10, the data characteristics include a range of allowed values 902 and a percentage of NULL values 904 for the particular decimal field. In some cases, other data characteristics can also be specified, such as a maximum number of allowed decimal places, an average value for the decimal field of all the generated records, or other characteristics. In some examples, if the user does not specify one or more of the data characteristics, a default value can apply. For instance, the default range 902 can be 0 to 1000 and the default percentage of NULL values 904 can be 0.

In one particular example, a user specified the range of allowed values 902 as 0-10 and the percentage of NULL values 904 as 10% for a particular field. In this example, if the user assigned random mode data generation to the particular field, a random decimal that falls within the range of allowed values 902 would be generated for that field for each record. Ten percent of the records would be given a NULL value. If the user assigned unique mode data generation to the particular field, a unique decimal that falls within the range of allowed values 902 would be generated for that field for each record (i.e., such that no two records would have the same value for the particular field).

Figure 11:
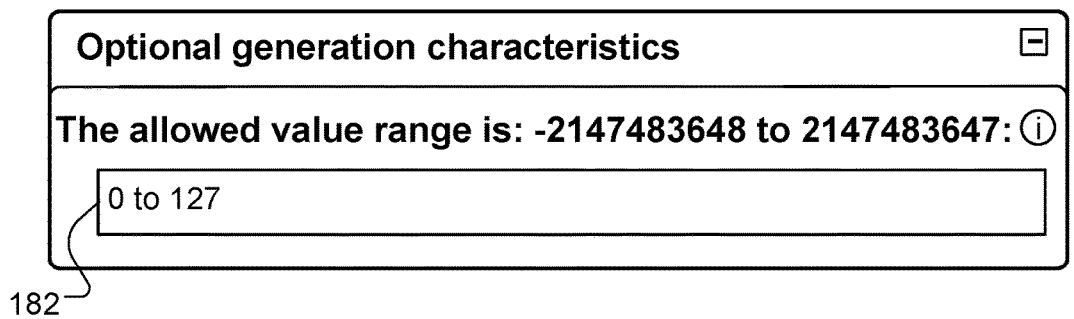
FIG. 11 is an integer characteristics window.

Referring to FIG. 11, an integer characteristics window 180 allows the user to specify data characteristics for an integer field. In the example of FIG. 11, the data characteristics include a range of allowed values 182. In some cases, other data characteristics can also be specified, such as a percentage of NULL values 184 for the particular integer field or an average value for the integer field of all the generated records. In some examples, if the user does not specify one or more of the data characteristics, a default value can apply. For instance, the default range 182 can be 0 to 127.

Figure 12:
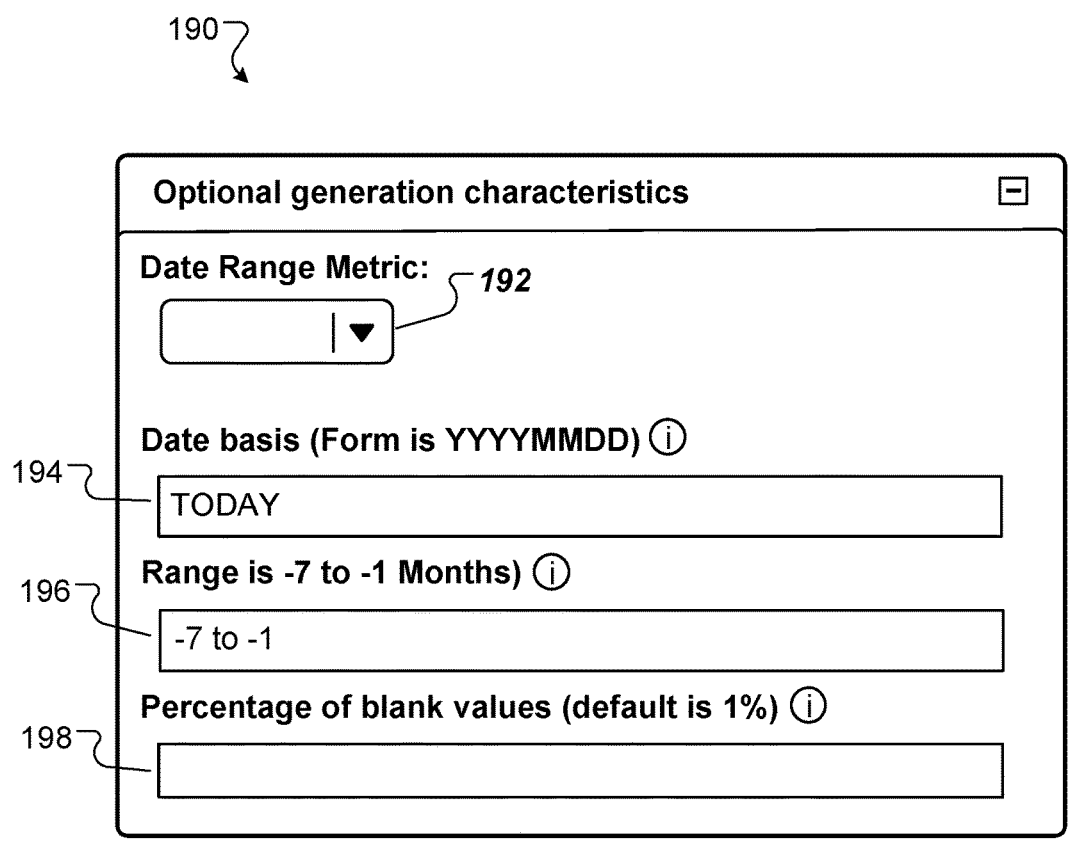
FIG. 12 is a date characteristics window.

Referring to FIG. 12, a date characteristics window 190 allows the user to specify data characteristics for a date field. In the example of FIG. 12, the data characteristics include a date range metric 192, such as years, months, or days. The data characteristics also include a date basis 194, which is the date to use as the basis relative to which a date range is to be calculated (e.g., written as YYYYMMDD), where YYYY refers to the year, MM refers to the month, and DD refers to the day. The data characteristics also include a range of allowed dates 196 relative to the date basis 194 and a percentage of NULL or blank values 198 for the particular date field. In some cases, other data characteristics can also be specified. In some examples, if the user does not specify one or more of the data characteristics, a default value can apply. For instance, the default date range metric 192 can be years, the default date basis 194 can be today, the range of allowed dates 196 can be −7 to 0 years (relative to the default date basis), and the default percentage of NULL values 198 can be 1%.

In one particular example, a user specified the date range metric 192 as days, the date basis 194 as Jan. 1, 2013, the range of allowed dates 196 as 365 (i.e., 365 days beyond the date basis of Jan. 1, 2013), and the percentage of NULL values 198 as zero for a particular field. In this example, if the user assigned random mode data generation to the particular field, a randomly selected date between Jan. 1, 2013, and Jan. 1, 2014, would be assigned to that field for each record. If the user assigned unique mode data generation to the particular field, a unique date between Jan. 1, 2013, and Jan. 1, 2014, would be assigned to that field for each record (i.e., such that no two records would have the same date for the particular field).

Figure 13:
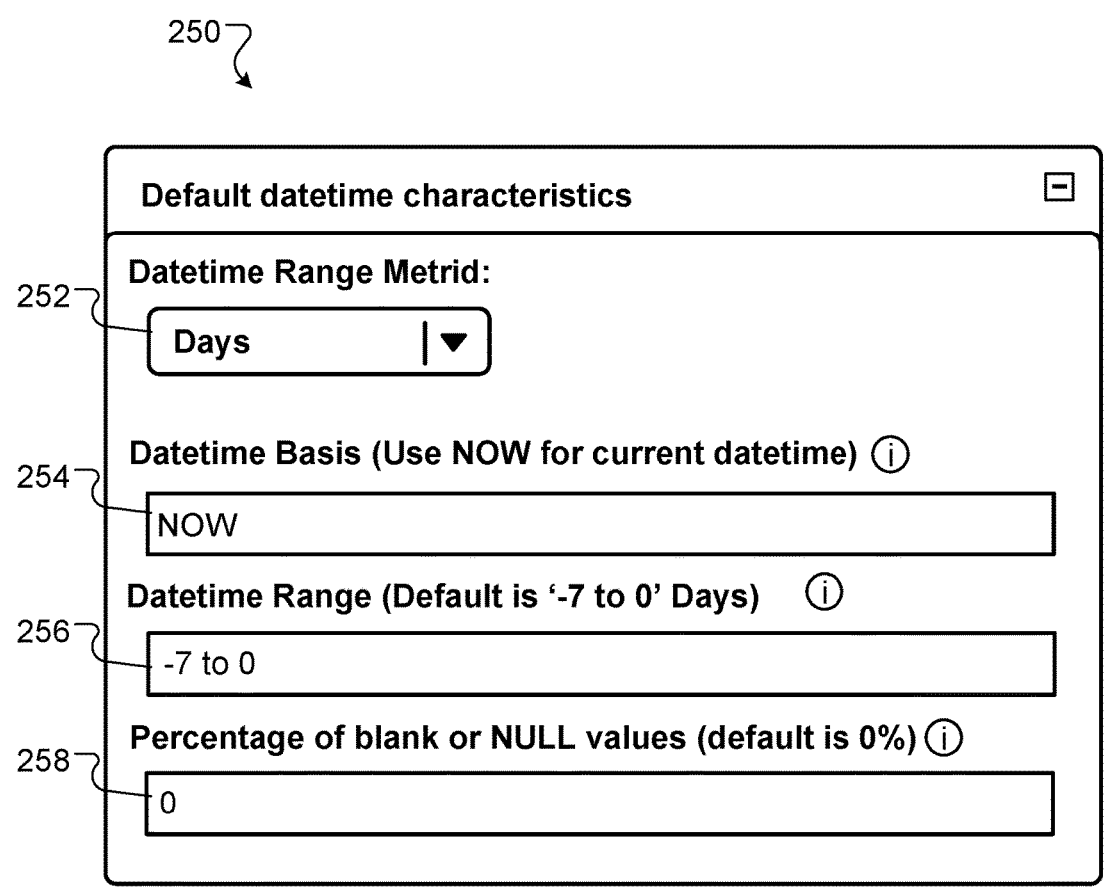
FIG. 13 is a datetime characteristics window.

Referring to FIG. 13, a datetime characteristics window 250 allows the user to specify data characteristics for a datetime field. In the example of FIG. 13, the data characteristics include a datetime range metric 252, such as years, months, or days. The data characteristics also include a datetime basis 254, which is the date and time to use as the basis relative to which a datetime range is to be calculated (e.g., written as YYYYMMDD HH24MISS.NNN), where YYYY refers to the year, MM refers to the month, DD refers to the day, HH24 refers to the hour on a 24-hour clock, MI refers to the minute, SS refers to the second, and NNN refers to the thousandth of a seconds. The data characteristics also include a range of allowed datetimes 256 relative to the datetime basis 254 and a percentage of NULL values 258 for the particular datetime field. In some cases, other data characteristics can also be specified. In some examples, if the user does not specify one or more of the data characteristics, a default value can apply. For instance, the default datetime range metric 252 can be days, the default datetime basis 254 can be now, the default range of allowed datetimes 256 can be −7 to 0 days, and the default percentage of NULL values 258 can be 0.

In some examples, one or more of the characteristics windows (e.g., the string characteristics window 800, the decimal characteristics window 900, the integer characteristics window 180, the date characteristics window 190, or the datetime characteristics window 250) enables a user to override a default error rate for a field, e.g., by selecting or specifying a value for a field error rate for the field. For instance, the user can select from the following error rates: none, 1 in 2 fields in error, 1 in 10, 1 in 100, 1 in 1000, 1 in 10000, and 1 in 100000. In some examples, the user can select or specify a percentage error rate.

In some examples, the user interface 30 provides a mechanism for a user to override the default data characteristics for one or more data types. For instance, the user can override the average string length for all string data. When the user overrides a default characteristic for a particular data type, that override characteristic applies to all data generation of that data type for which the user does not specify a data characteristic.

If list mode data generation is assigned to a field, a list window can be displayed in the user interface 30 that enables a list of allowed values for the field to be provided. For instance, if list mode data generation is assigned to the building_num field, the user can provide a list of building numbers (e.g., {10, 20, 30, 40, 50}) that can be used as values for the building_num field. When data is generated for the building_num field by the data generation engine 150, the value of the field for each record can be selected at random from the list of building numbers. In some examples, other constraints can apply. For instance, the value of a field can be selected from the list subject to a constraint that each item on the list be selected an equal number of times.

In some examples, advanced rules for data generation or source-to-target format mapping can be created. For instance, advanced rules can include rules to map values in one field into another field, rules to use the values in one field to calculate the values in another field, or rules to use more than one field in the source to create a single field in the target. In some examples, the advanced rules can relate values in a field of the data source to values to be generated for a field of the target. In some examples, the advanced rule can relate values in a first field of the target to values to be generated for a second field of the target. The user interface 30 can provide a rules editor capability that enables a user to generate an advanced rule for generation of data for one or more target fields, such as the configuration screen and rules editor shown in FIGS. 14A-14C, 15A-15C, and 16. For instance, the user interface 30 can provide a rules window that enables the user to specify a rule that is associated with a field, where the rule can be used to generate data to populate the field. The user interface 30 can provide a rules editor that enables the user to define the rule.

For instance, referring to FIGS. 14A-14C, the rules editor capability of the user interface 30 enables a user to create an advanced rule to map values in one field into another field. In this example, the user wants to create a rule that enables the generation of both a state_cd field whose values are selected from a list of two-letter abbreviations of the New England states based on a state_name field whose values are the corresponding full state names. To create this rule, the user can assign list generation mode to the state_cd field through a configuration window 350 for the state_cd field (FIG. 14A) and specify a list 352 (in this case, the list of two-letter abbreviations of the New England states: MA, CT, RI, VT, ME, NH) from which the values for the state_cd field can be selected. In a rules window 354 (FIG. 14B), the user can indicate that the state_name field 356 is to be associated with a rule "Compute state_name" 358 that can be used to populate data in the state_name field 356. The user can define the "Compute state_name" rule for the state_name field in a rules editor 360 (FIG. 14C). In this example, the "Compute state_name" rule specifies the value that is to be assigned for the state_name field for each value of the state_cd field.

Figures 15A, 15B:
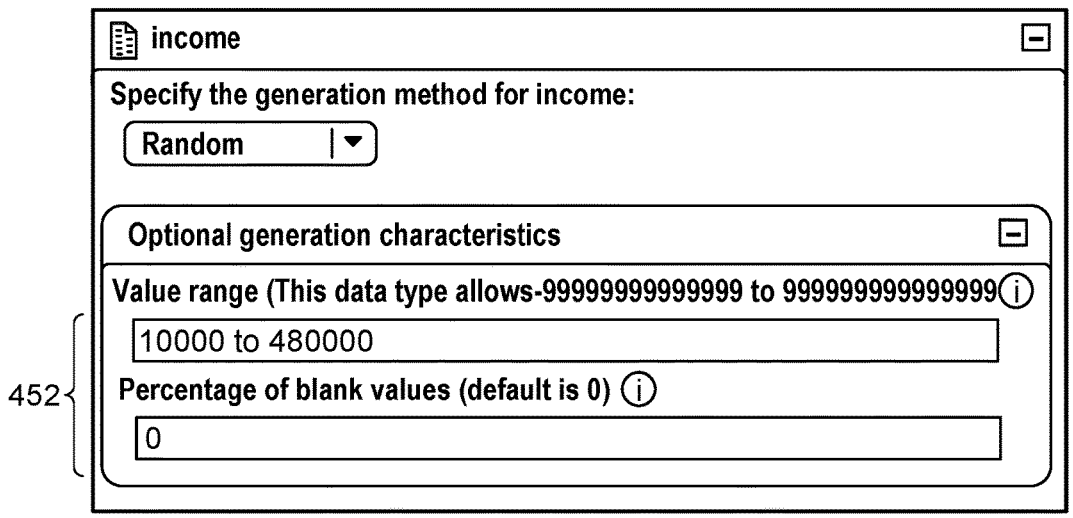

For instance, referring to FIGS. 15A-15C, the rules editor capability of the user interface 30 enables a user to create an advanced rule to use the value for a first field in the target to calculate the value for a second field in the target. In this example, the user wants to create a rule that uses the value for an income field to calculate the value of a tax_rate field. To create this rule, the user can assign random generation mode to the income field through a content generation window 450 for the income field (FIG. 15A) and specify data characteristics 452, such as a range of allowed values and a percentage of blank values, for the income field. In a rules window 454 (FIG. 15B), the user can indicate that the tax_rate field 456 is to be associated with a rule "Compute tax_rate" 458 that can be used to populate data in the tax_rate field 456. The user can define the rule for the tax_rate field in a rules editor 460 (FIG. 15C). In this example, the "Compute tax_rate" rule 458 specifies the value that is to be assigned for the tax_rate field for each value of the income field. The "Compute tax_rate" rule also specifies a default value 462 to be assigned for the tax_rate field, e.g., if the income field is blank, NULL, or in error.

For instance, referring to FIG. 16, the rules editor capability of the user interface 30 enables a user to create an advanced rule to map multiple source fields into a single target field. In some cases, the record format of one or more of the source fields can be different from the record format of the target field. In this example, the user wants to create a rule that specifies an expression to use the value of both a firstname field and a lastname field in generating data for a fullname field. To create this rule, in a rules window 550, the user can define a rule 552 for the fullname field 554 as a combination of the firstname field 556 from the source, a space, and the lastname field 558 from the source ("firstname"+" "+"lastname").

Data can be generated based on one or more of the format specification(s), content criterion or criteria, data generation mode, and advanced rules. For instance, data in the source records can be modified, one or more new fields can be created and populated with data, and/or new records can be created and populated with data.

In some examples, a subject-area can be created. A subject-area is a collection of datasets that are related to each other in a hierarchy through a key relationship in at least one field. For instance, an existing parent dataset can be a set of customer records and a child dataset can be a set of one or more generated transaction records for each existing customer.

Figure 17A:
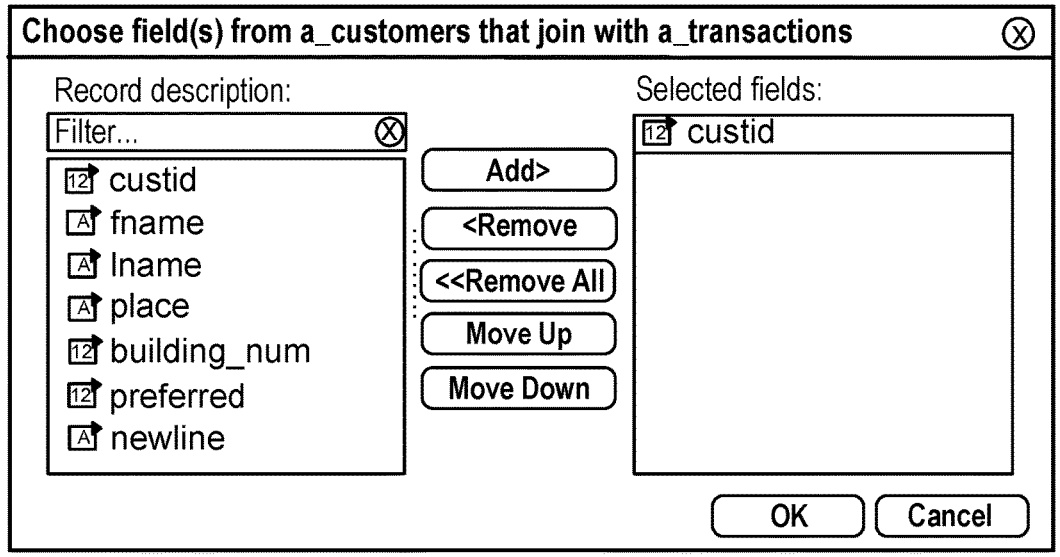
FIGS. 17A-17B are windows for subject-area datasets.
Figure 17B:
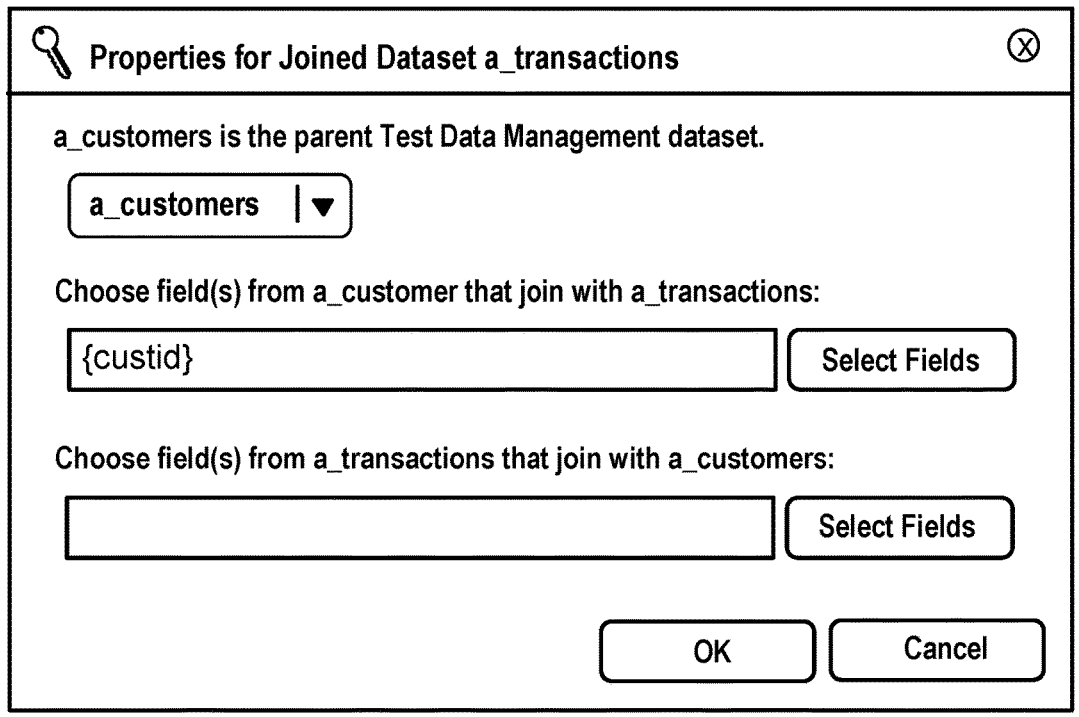

Referring to FIG. 17A, in one example, a join window 70 allows a user to specify the one or more fields of the existing parent dataset to be used as a key field with a child dataset to be generated. In the example of FIG. 17A, the existing parent dataset is a customer dataset and a transaction dataset is to be generated as a child with a join key field custid. Referring to FIG. 17B, a join window 75 allows a user to specify one or more join key fields for the child dataset. In this example, the custid field has already been specified as a join key field from the parent dataset at box 76. At box 78, a field can be specified as a join key field from the child dataset. In some examples, non-joining records, such as a parent record without a corresponding child record or a child record without a corresponding parent record, can be excluded from the subject-area dataset. In some examples, even non-joining records can be included in the subject-area dataset.

In some examples, a subject-area can be created for referential integrity, meaning that the subject-area will provide only data records that ensure referential integrity of the hierarchical datasets of the subject-area. By referential integrity, we mean that that each record of the subject-area is joined to at least one other record of the subject-area. For instance, an example subject-area may include a first dataset that associates an account identifier with each transaction record. In another dataset of the subject-area, each customer identifier may be associated with multiple account identifiers and with multiple product identifiers. Ensuring referential integrity of the subject-area means ensuring that all of the records included in the subject-area datasets are validly joined with one or more other records in the subject-area dataset. In some examples, a subject-area can be created to include both data records that result from any applicable subsetting rules and data records that ensure referential integrity. That is, for instance, even records that do not satisfy a referential integrity criterion may be included in a subject-area to satisfy a subsetting rule. Further description of subsetting rules is provided in U.S. patent application Ser. No. 13/827,558, entitled "Data Records Selection," the contents of which are incorporated herein by reference.

In some examples, a virtual dataset can be created based on one or more existing datasets. For instance, based on a customer dataset and a transaction dataset, a new rollup dataset can be generated that includes one or more fields having values such as a number of transactions per customer or a dollar amount spent per customer. Such a rollup dataset can be useful, e.g., in a data processing application that operates on high volume or low volume customers.

Referring again to FIG. 2, in some examples, an analysis engine 38 can perform automated analysis to implement one or more of the format specification(s), content criterion or criteria, data generation mode, and advanced rules for the generated data. For instance, as a basic example, if a user specifies a date basis of May 1, 2000 and a range of allowed dates as 10 years, the analysis engine 38 can identify May 1, 2000, to May 1, 2010, as the range of allowed dates without the user specifying the exact dates.

In another example, the analysis engine 38 can determine the distribution of string lengths across multiple records that will achieve the average string length and maximum string length specified by a user. For instance, the analysis engine can determine the distribution of string lengths based on a default target ratio between a default maximum string length and a default average string length. The default target ratio can be applied to the maximum string length to identify the peak string length in a string length distribution, such as a Gaussian distribution. For instance, in one example, the default maximum string length is 16 and the default average string length is 8, such that the default target ratio is 0.5. This default target ratio can be applied to the generation of strings, e.g., the random generation of strings. For instance, in a field that is limited to a maximum string length of 6, the default target ratio is applied to determine a peak string length of 3. Strings will thus be generated in a Gaussian distribution around the peak string length of 3. In another example, in a field that is limited to a maximum string length of 25, the default target ratio is applied to determine a peak string length of 12-13. Strings will thus be generated in a Gaussian distribution around the peak string length of 12-13.

In some examples, the analysis engine 38 can determine one or more of the format specification(s), content criterion or criteria, data generation mode, and advanced rules automatically, e.g., by an automated analysis of source records. For instance, the analysis engine 38 can determine how to modify existing data and/or generate new data for a particular field to achieve a target distribution of values for that field.

Figure 18:
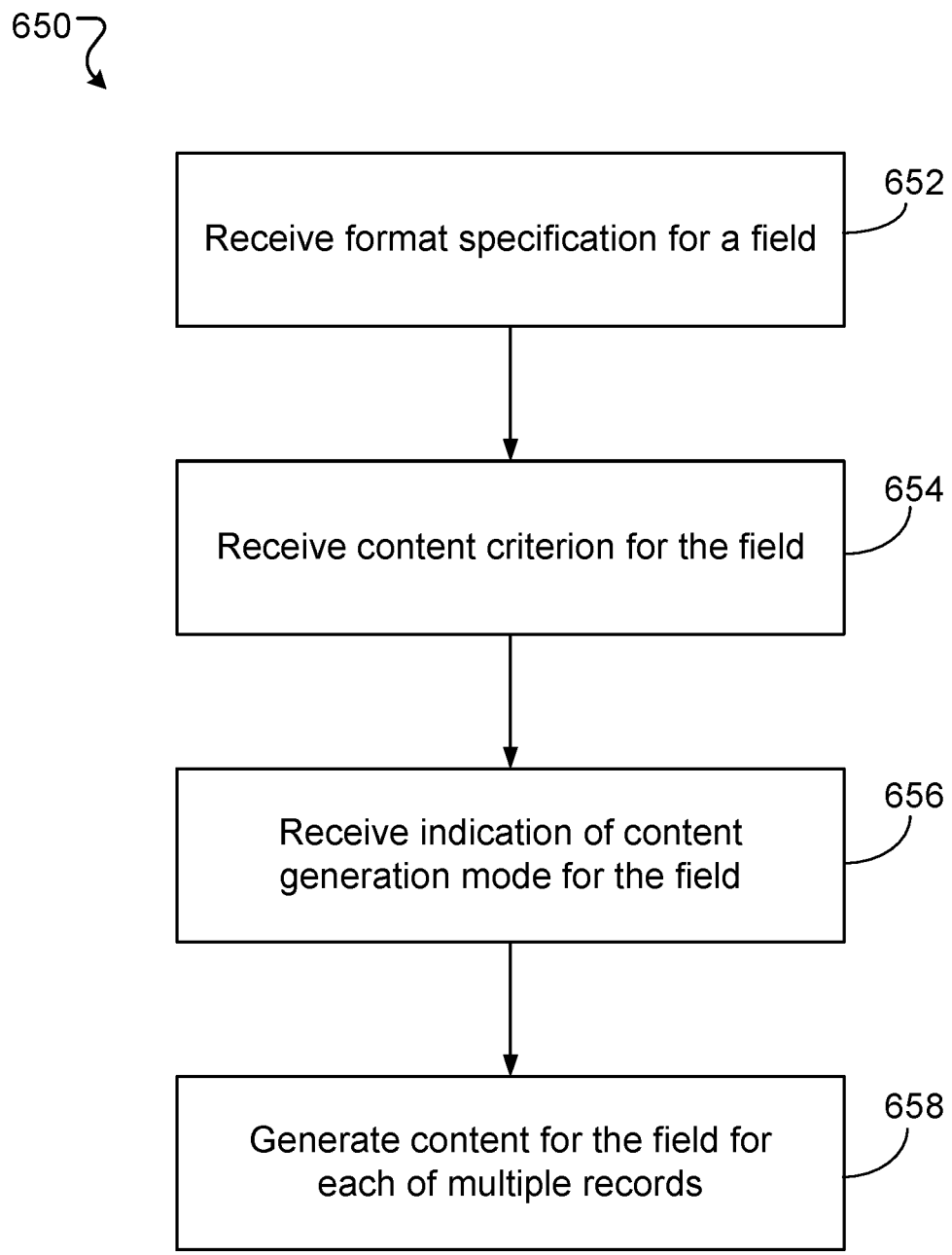
FIG. 18 is a flow chart.

Referring to FIG. 18, in a general approach to data generation 650, a format specification is received for a field (652). The format specification can be, e.g., a data type for data to be generated for the field, such as a string, decimal, integer, date, or datetime. For example, the system 100 can generate data according to the general approach to data generation 650. In some examples, the format specification can be received from a user through a user interface, such as user interface 30 (e.g., a data type window provided through the user interface 30).

A content criterion is received for the field (654). The content criterion can be, e.g., a data characteristic for the data to be generated for the field. For instance, data characteristics for a numerical field, such as a decimal field or an integer field, can indicate a maximum allowed value, a minimum allowed value, an allowed range of values, or an average value for the field across all records. Data characteristics for a string field can indicate a maximum allowed number of characters, a minimum allowed number of characters, an average number of characters, or a set of allowed characters. Data characteristics for a temporal field, such as a date field or a datetime field, can indicate a date or datetime metric, a date or datetime basis, or a date or datetime range. In some examples, a field error rate (i.e., a number or percentage of records to contain errors) can also be specified for one or more fields. In some examples, the content criterion can be received from a user through a user interface, such as the user interface 30 (e.g., the string characteristics window 800, the decimal characteristics window 900, the integer characteristics window 180, the date characteristics window 190, or the datetime characteristics window 250).

An indication of a content generation mode for the field is received (656). The content generation mode is the mode by which content is to be generated for the field. For instance, the content generation mode can be selected from the following modes: unique mode, random mode, default mode, and list mode. In unique mode, a unique value can be generated for the selected field. In random mode, a random value can be generated for the selected field. In default mode, default characteristics or default values, e.g., that are specified in the record format of the target, can be used to generate values. In list mode, values are selected from a list of allowed values. In some cases, if a content generation mode is not assigned for a given field, the default mode can be used to generate data for that field. In some examples, the indication of the content generation mode is received from a user through a user interface, such as the user interface 30 (e.g., a content generation window provided through the user interface).

Content for the field for each of multiple records is generated (658) according to the indicated content generation mode. The generated content for the field satisfies the format specification and the content criterion for the field. In some examples, a new field can be created for each of multiple existing records, and content can be generated for the new field according to the indicated content generation mode. In some examples, multiple new records can be created, each record having one or more fields for which content can be generated according to the indicated content generation mode. For instance, multiple new records can be created based on each existing record.

In some examples, data generation can be used to create a set of records that has one or more desired features. For instance, data generation can be used to create a set of records having a desired number of records and/or a desired distribution of values in a field, for processing by a data processing application. Example data processing applications include, e.g., data processing applications for customer billing (e.g., for telephone customer billing), data processing applications that process customer records (e.g., to identify demographic trends in customer purchasing patterns), and other types of data processing applications.

Data processing applications often implement rules whose execution depends on (e.g., is triggered by) the value of one or more variables. For example, the variables may be input variables corresponding to input data, or derived variables that depend on one or more input variables. For effective testing of the data processing application, input data can be provided that is sufficient to cause every rule in the application to be executed (e.g., such that complete code coverage in the application is achieved), such that every rule is executed at least a corresponding minimum number of times, and/or such that every rule is executed no more than a corresponding maximum number of times.

Figure 19:
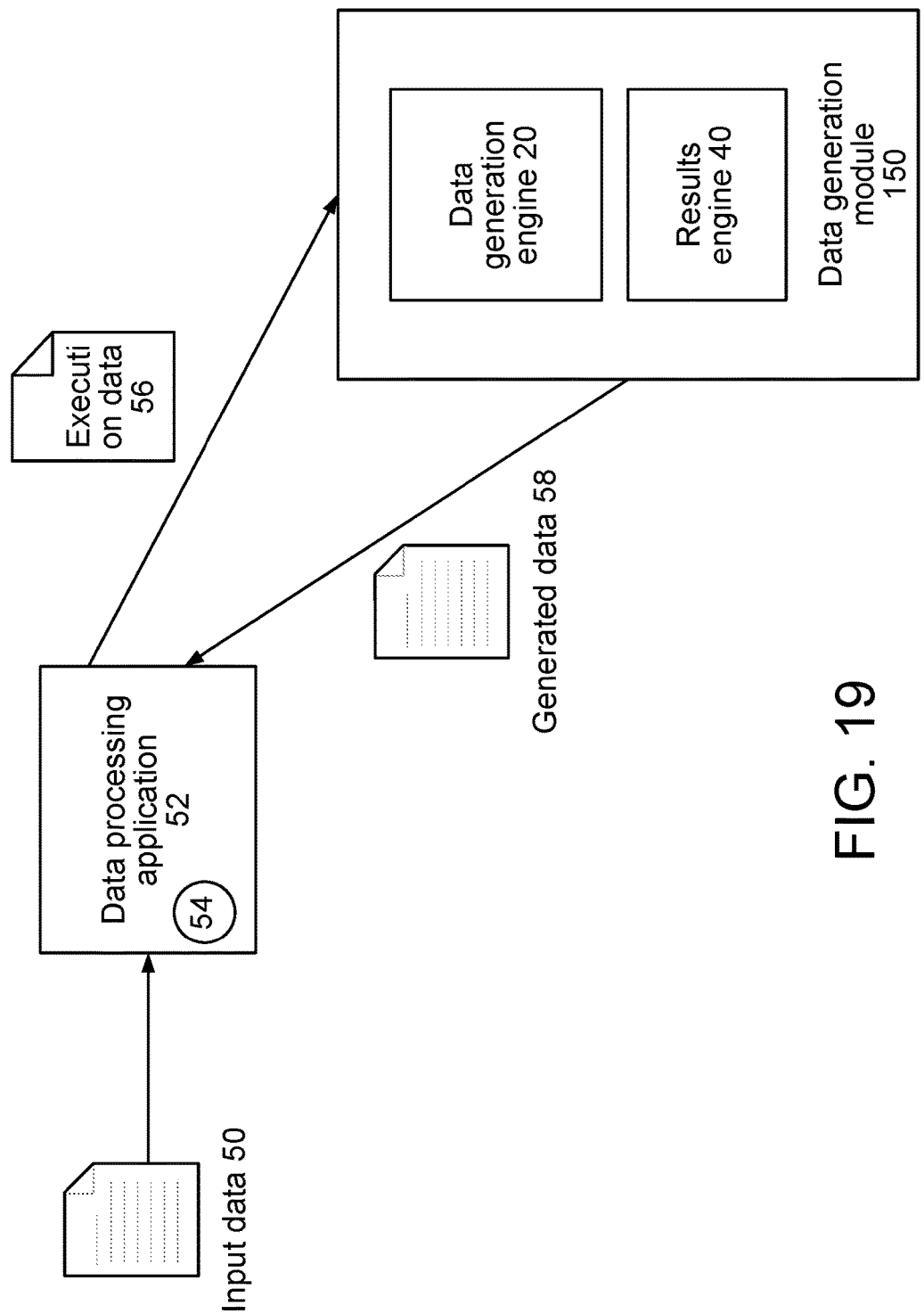
FIG. 19 is a block diagram of a data processing application.

Referring to FIG. 19, in some examples, input data records 50 can be provided as input data to a data processing application 52. The data processing application 52 implements one or more rules 54. A rule is a set of criteria that can be used, for example, for converting data from one format to another, making determinations about data, or generating new data based on a set of input data. Further description of rules can be found in U.S. patent application Ser. No. 11/733,434, filed Apr. 10, 2007, the contents of which are incorporated herein by reference in their entirety.

Each rule 54 implemented by the data processing application 52 can be executed when a corresponding condition expression for the rule is satisfied and is not executed by the data processing application 52 if the corresponding condition expression is not satisfied. A rule 54 can be specified by a specification that includes at least a condition expression and an execution expression. When the condition expression is satisfied (e.g., the condition expression is evaluated with a true result), the execution expression can be evaluated. The condition expression can depend on (e.g., is triggered by) the value of one or more variables, which can be, e.g., input variables corresponding to input data 50 or derived variables that depend on one or more input variables. In some cases, the application executes all of the rules 54 that are triggered. In some cases, the application executes fewer than all of the rules 54 that are triggered, such as some of the rules 54 or only one of the rules 54 (e.g., a first rule 54 that is triggered). Further description of the execution of such data processing applications is provided in U.S. patent application Ser. No. 13/827,558, entitled "Data Records Selection," the contents of which are incorporated herein by reference.

The rules can be any rule that can be executed when a corresponding condition expression is satisfied. In one example, a rule in a data processing application that identifies marketing offers for customers of a retail store can be a rule that identifies a particular marketing offer for customers that have an income less than $20,000. In one example, a rule in a data processing application that generates bills for customers of a telephone company can be a rule that applies a surcharge to the bill of any customer whose mobile phone minutes for the past month exceeded the allowed mobile phone minutes for the customer's service plan.

Execution data 56 generated by the data processing application 52 can provide information about the execution of the data processing application 52, such as rules 54 in the application 52 that did or did not execute, a number of times each rule 54 in the application 52 was executed, or other information. The execution data 56 can be provided to the data generation module 150. Based on the execution data 56, a results engine 40 in the data generation module 150 (FIG. 2) can identify desired input data or input data criteria for the data processing application 52, such as input data that would have caused the unexecuted rules 54 to be executed, input data that would have caused a particular rule 54 to be executed a specified number of times, or input data that would have caused another desired execution result. For instance, the desired execution result can be specified by a user, e.g., through the user interface 30.

The data generation engine 20 of the data generation module 150 can generate data 58 to satisfy the desired input data criteria. The generated data 58 can be provided as input data to the data processing application 52. That is, for example, the data generation engine 20 can generate data to cause a previously unexecuted rule in the data processing application to execute, to cause a particular rule to be executed more or fewer times, or to cause another desired execution result. In one example, a record having a value of greater than $1,00,000 for an income field can be generated to cause execution of a rule that executes only for input data having income>$1,000,000. In one example, a first rule executes if a gender field has a value of "F" and a second rule executes if the gender field has a value of "M." If, upon initial execution of the data processing application, the execution data 56 indicate that the first rule is executed only once while the second rule is executed fifty times, data can be generated by the data generation engine 20 to satisfy the desired execution result, e.g., as specified by a user, that the first rule and the second rule are executed approximately the same number of times. For instance, the data generation engine 20 can create additional records having gender="F" or modify the value for the gender field for some of the existing records.

Figure 20:
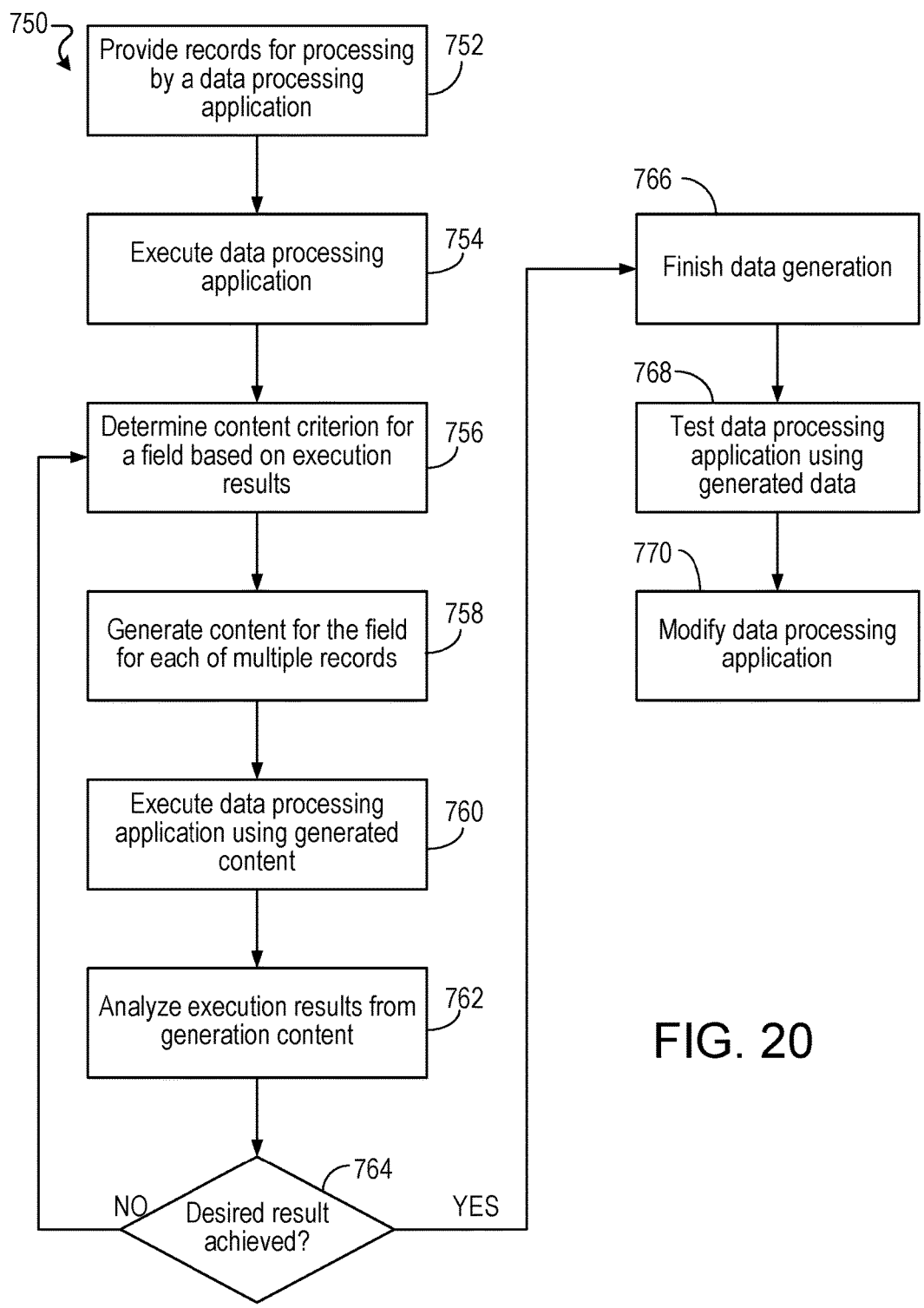
FIG. 20 is a flow chart.

Referring to FIG. 20, a general approach 750 implemented by the data generation module 150 generates a set of test data that is suited for a data processing application. For instance, the set of test data can be processed by the data processing application to yield a desired execution result, such as the execution of each rule of the data processing application a desired number of times. In the approach 750, one or more records are provided for processing by a data processing application that implements one or more rules (752). Each record can have one or more fields. The data processing application can be executed (754).

Based on a number of times each rule was executed by the data processing application, a content criterion can be determined for a particular field of the one or more records by the results engine 40 of the data generation module 150 (756). In some examples, the content criterion for the particular field can be determined so that data generated according to the content criterion can achieve a desired execution result when processed by the data processing application, such as to cause the execution of a previously unexecuted rule or to cause a particular rule to be executed more or fewer times. The content criterion can be, e.g., a data characteristic for the data to be generated for the field. For instance, data characteristics for a numerical field, such as a decimal field or an integer field, can indicate a maximum allowed value, a minimum allowed value, an allowed range of values, or an average value for the field across all records. Data characteristics for a string field can indicate a maximum allowed number of characters, a minimum allowed number of characters, an average number of characters, or a set of allowed characters. Data characteristics for a temporal field, such as a date field or a datetime field, can indicate a date or datetime metric, a date or datetime basis, or a date or datetime range.

Content can be generated for the particular field based on the content criterion and based on a format specification for the particular field (758). In some examples, content for the particular field in existing records can be modified. In some examples, new records can be created and content can be generated for the particular field in the new records.

The data processing application can be executed using at least the newly generated content as input data (760). In some examples, the existing records including modified values for the particular field can be provided to the data processing application. In some examples, the existing records can be provided to the data processing application along with newly created records. In some examples, only the newly created records can be provided to the data processing application.

The results of the execution of the data processing application using at least the newly generated content as input data can be analyzed (762). If the desired execution result was achieved (764), such as the rules in the data processing application being executed a desired number of times, the data generation process is completed (766). If the desired execution result was not achieved (764), further content criteria can be determined (757) and new content can again be generated (758) to be used as input data for the data processing application.

In some examples, the approach 750 can be implemented to generate a set of test data for the data processing application that causes all of the rules of the data processing application to execute at least once. That is, in order to thoroughly test the data processing application, data can be provided that triggers every possible action in the data processing application. If such data do not exist, the data can be generated. For instance, once the data generation process is completed (766), the generated set of data can be processed by the data processing application to test the execution of the data processing application (768). Because the generated set of data causes every possible action in the data processing application to be executed, the data processing application can be thoroughly tested. If the data processing application does not perform as expected (e.g., if an action of the data processing application does not perform as expected), the data processing application can be modified as appropriate (770) and tested until satisfactory results are achieved.

In some examples, the approach 750 can be implemented to generate a set of realistic data for processing by the data processing application. For instance, a data processing application for a retail corporation may generate trend reports indicative of customer buying patterns. To preserve customer privacy, a set of realistic but fictional data records can be generated for processing by the data processing application. In some cases, the generated data can share characteristics with actual customer data, such as distributions of values across records of the data set (e.g., the income distribution of the customers), without revealing sensitive personal information. In some examples, the set of realistic data can be data indicative of physical processes, data indicative of financial transactions, data indicative of human or animal behaviors, or other data.

Embodiment 1 is directed to a method including, based on a number of times each of one or more rules was executed by a data processing application during processing of one or more records, determining a content criterion for each of one or more fields; generating content for each of the fields based on the content criterion; and populating each of the fields in one or more records with the generated content.

Embodiment 2 is directed to embodiment 1, wherein generating content includes generating content based on a format specification for each of the fields.

Embodiment 3 is directed to embodiment 1 or 2, wherein the format specification indicates a type of content.

Embodiment 4 is directed to embodiment 3, wherein the type of content includes one or more of a string, a decimal, an integer, a date, or a datetime.

Embodiment 5 is directed to any of embodiments 2 to 4, including receiving the format specification through a user interface.

Embodiment 6 is directed to any of the preceding embodiments, including creating a new record including one or more of the fields; and populating the fields for the new record.

Embodiment 7 is directed to embodiment any of the preceding embodiments, wherein populating each of the fields with the generated content includes modifying pre-existing content for one or more of the fields.

Embodiment 8 is directed to any of the preceding embodiments, wherein populating each of the fields includes creating the particular field for one or more pre-existing records.

Embodiment 9 is directed to any of the preceding embodiment, wherein the content criterion includes one or more of a target value, a target range of values, a target distribution of values, a maximum value, or a minimum value.

Embodiment 10 is directed to any of the preceding embodiment, wherein the content criterion includes particular values for the generated content.

Embodiment 11 is directed to any of the preceding embodiment, wherein the content criterion is indicative of a target combination of content to be included in two or more of the one or more fields.

Embodiment 12 is directed to any of the preceding embodiment, including receiving the content criterion through a user interface.

Embodiment 13 is directed to any of the preceding embodiment, wherein generating content includes generating content based on a generation mode.

Embodiment 14 is directed to embodiment 13, wherein the generation mode includes one or more of (i) generation of random content for one or more of the fields for each of multiple records, (ii) generation of unique content for one or more of the fields for each of multiple records, and (iii) selection of content for one or more of the fields for each of multiple records from a set of available content.

Embodiment 15 is directed to any of the preceding embodiment, including providing one or more records including the generated content to the data processing application.

Embodiment 16 is directed to any of the preceding embodiment, wherein the content criterion is determined to cause a particular rule to be executed by the data processing application.

Embodiment 17 is directed to any of the preceding embodiment, wherein determining the content criterion includes identifying a particular rule that was executed less than a minimum threshold number of times; and determining the content criterion to cause the particular rule to be executed at least the minimum threshold number of times.

Embodiment 18 is directed to a non-transitory computer readable medium storing instructions for causing a computer system to based on a number of times each of one or more rules was executed by a data processing application during processing of one or more records, determine a content criterion for each of one or more fields; generate content for each of the fields based on the content criterion; and populate each of the fields in one or more records with the generated content.

Embodiment 19 is directed to a computing system including at least one processor configured to based on a number of times each of one or more rules was executed by a data processing application during processing of one or more records, determine a content criterion for each of one or more fields; generate content for each of the fields based on the content criterion; and populate each of the fields in one or more records with the generated content.

Embodiment 20 is directed to a computing system including means for, based on a number of times each of one or more rules was executed by a data processing application during processing of one or more records, determining a content criterion for each of one or more fields; means for generating content for each of the fields based on the content criterion; and means for populating each of the fields in one or more records with the generated content.

Embodiment 21 is directed to a method for testing a data processing application during development of the data processing application, the method including processing first data records using the data processing application, the data processing application implementing one or more rules, each first data record having multiple fields; comparing a number of times each rule of the data processing application is executed during processing of the first data records with a target value for the rule; based on the results of the comparing, determining a content criterion indicative of a target characteristic for data in second data records to be processed using the data processing application; generating content for one or more fields of the second data records according to a format of the first data records and according to the content criterion; processing the second data records using the data processing application; comparing a number of times each rule of the data processing application is executed during processing of the second data records with the target value for the rule and determining that the target value for each rule is satisfied; and testing the data processing application using the second data records.

Embodiment 22 is directed to embodiment 21, including receiving the first data records at a client device, wherein the data processing application is executed on the client device.

Embodiment 23 is directed to embodiment 22, wherein the client device comprises a computing device.

Embodiment 24 is directed to embodiment 21 or 22, including receiving the first data records from a remove server.

Embodiment 25 is directed to embodiment 24, including receiving the first data records at a client device that is communicatively coupled to a server via a LAN or WAN connection.

Embodiment 26 is directed to any of embodiments 21 to 25, including determining the content criterion such that the data in the second data records causes the target value for each rule to be satisfied when the data processing application processes the second data records.

Embodiment 27 is directed to any of embodiments 21 to 26, wherein generating content for one or more fields of the second data records includes modifying content in one or more fields of the first data records, and wherein the modified first data records are the second data records.

Embodiment 28 is directed to any of embodiments 21 to 27, wherein generating content for one or more fields of the second data records includes creating a new data record.

Embodiment 29 is directed to any of embodiments 21 to 28, including storing the second data records in a storage device.

Embodiment 30 is directed to any of embodiments 21 to 29, including modifying the data processing application based on a result of the testing.

Embodiment 31 is directed to any of embodiments 21 to 30, wherein testing the data processing application includes modifying the data processing application based on a result of processing the second data records using the data processing application.

Embodiment 32 is directed to any of embodiments 21 to 31, including determining the content criterion such that the data in the second data records is substantially similar to data expected to be processed by the data processing application in a production environment.

The data generation techniques described above can be implemented using a computing system executing suitable software. For instance, the computing system can include the system 100, the development environment 118, the data generation module 150, and other computing systems. For example, the software may include procedures in one or more computer programs that execute on one or more programmed or programmable computing system (which may be of various architectures such as distributed, client/server, or grid) each including at least one processor, at least one data storage system (including volatile and/or non-volatile memory and/or storage elements), at least one user interface (for receiving input using at least one input device or port, and for providing output using at least one output device or port). The software may include one or more modules of a larger program, for example, that provides services related to the design, configuration, and execution of dataflow graphs. The modules of the program (e.g., elements of a dataflow graph) can be implemented as data structures or other organized data conforming to a data model stored in a data repository.

The software may be provided on a tangible, non-transitory medium, such as a CD-ROM or other computer-readable medium (e.g., readable by a general or special purpose computing system or device), or delivered (e.g., encoded in a propagated signal) over a communication medium of a network to a tangible, non-transitory medium of a computing system where it is executed. Some or all of the processing may be performed on a special purpose computer, or using special-purpose hardware, such as coprocessors or field-programmable gate arrays (FPGAs) or dedicated, application-specific integrated circuits (ASICs). The processing may be implemented in a distributed manner in which different parts of the computation specified by the software are performed by different computing elements. Each such computer program is preferably stored on or downloaded to a computer-readable storage medium (e.g., solid state memory or media, or magnetic or optical media) of a storage device accessible by a general or special purpose programmable computer, for configuring and operating the computer when the storage device medium is read by the computer to perform the processing described herein. The inventive system may also be considered to be implemented as a tangible, non-transitory medium, configured with a computer program, where the medium so configured causes a computer to operate in a specific and predefined manner to perform one or more of the processing steps described herein.

A number of embodiments of the invention have been described. Nevertheless, is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. A method for generating content for data records to cause execution of a processing rule during processing of the data records, the method including:
   receiving execution information indicative of a first number of times a processing rule of a data processing application was executed during processing of a first set of data records by the data processing application, wherein whether the processing rule is executed by the data processing application during processing of a particular data record depends directly or indirectly on a value in each of one or more data fields of the particular data record;
   when the first number of times the processing rule was executed is less than a threshold number of times, determining a content criterion indicative of a characteristic of content to be generated for each of one or more fields;
   generating content according to the content criterion;
   populating one or more data fields of a second set of data records with the content generated according to the content criterion, wherein the second set of data records populated with the generated content is sufficient to cause execution of the processing rule a second number of times equal to or greater than the threshold number of times when the second set of data records populated with the generated content is processed by the data processing application; and
   whereby the second set of data records is configured to be processed by the data processing application to test the data processing application.

2. The method of claim 1, in which generating content includes generating content based on a format specification for each of the fields.

3. The method of claim 1, which populating the one or more data fields of the second set of data records includes:
   creating a new data record including the one or more fields; and
   populating the one or more fields for the new data record.

4. The method of claim 1, in which populating the one or more data fields with the generated content includes modifying pre-existing content for one or more of the data fields of the second set of data records.

5. The method of claim 1, which populating the one or more data fields includes creating a data field for one or more pre-existing data records.

6. The method of claim 1, in which the content criterion includes one or more of a target value, a target range of values, a target distribution of values, a maximum value, or a minimum value.

7. The method of claim 1, in which the content criterion includes particular values for the generated content.

8. The method of claim 1, which the content criterion is indicative of a target combination of content to be included in two or more of the one or more data fields.

9. The method of claim 1, which generating content includes generating content based on a generation mode.

10. The method of claim 9, in which the generation mode includes one or more of (i) generation of random content for one or more of the data fields for each of multiple data records, (ii) generation of unique content for one or more of the data fields for each of multiple data records, and (iii) selection of content for one or more of the data fields for each of multiple data records from a set of available content.

11. The method of claim 1, including providing the second set of data records including the generated content to the data processing application.

12. The method of claim 1, which determining the content criterion includes determining the content criterion to cause the processing rule to be executed a number of times equal to or greater than the threshold number of times.

13. A non-transitory computer readable storage medium storing instructions for causing a computing system to generate content for data records to cause execution of a processing rule during processing of the data records, including:
   receiving execution information indicative of a first number of times a processing rule of a data processing application was executed during processing of a first set of data records by the data processing application, wherein whether the processing rule is executed by the data processing application during processing of a particular data record depends directly or indirectly on a value in each of one or more data fields of the particular data record;
   when the first number of times the processing rule was executed is less than a threshold number of times, determining a content criterion indicative of a characteristic of content to be generated for each of one or more fields;
   generating content according to the content criterion; and
   populating one or more data fields of a second set of data records with the content generated according to the content criterion, wherein the second set of data records populated with the generated content is sufficient to cause execution of the processing rule a second number of times equal to or greater than the threshold number of times when the second set of data records populated with the generated content is processed by the data processing application; and whereby the second set of data records is configured to be processed by the data processing application to test the data processing application.

14. The non-transitory computer readable storage medium of claim 13, in which generating content includes generating content based on a format specification for each of the fields.

15. The non-transitory computer readable storage medium of claim 13, in which populating the one or more data fields of the second set of data records includes:

creating a new data record including the one or more fields; and populating the one or more fields for the new data record.

16. The non-transitory computer readable storage medium of claim 13, in which populating the one or more data fields with the generated content includes modifying preexisting content for one or more of the data fields of the second set of data records.

17. The non-transitory computer readable storage medium of claim 13, in which populating the one or more data fields includes creating a data field for one or more pre-existing data records.

18. The non-transitory computer readable storage medium of claim 13, in which the content criterion includes one or more of a target value, a target range of values, a target distribution of values, a maximum value, or a minimum value.

19. The non-transitory computer readable storage medium of claim 13, in which the content criterion includes particular values for the generated content.

20. The non-transitory computer readable storage medium of claim 13, in which the content criterion is indicative of a target combination of content to be included in two or more of the one or more data fields.

21. The non-transitory computer readable storage medium of claim 13, in which generating content includes generating content based on a generation mode.

22. The non-transitory computer readable storage medium of claim 21, in which the generation mode includes one or more of (i) generation of random content for one or more of the data fields for each of multiple data records, (ii) generation of unique content for one or more of the data fields for each of multiple data records, and (iii) selection of content for one or more of the data fields for each of multiple data records from a set of available content.

23. The non-transitory computer readable storage medium of claim 13, the instructions causing the computing system to provide the second set of data records including the generated content to the data processing application.

24. The non-transitory computer readable storage medium of claim 13, in which determining the content criterion includes determining the content criterion to cause the processing rule to be executed a number of times equal to or greater than the threshold number of times.

25. A computing system for generating content for data records to cause execution of a processing rule during processing of the data records, the computing system including: one or more processors coupled to a memory, the one or more processors and memory configured to:

receive execution information indicative of a first number of times a processing rule of a data processing application was executed during processing of a first set of data records by the data processing application, wherein whether the processing rule is executed by the data processing application during processing of a particular data record depends directly or indirectly on a value in each of one or more data fields of the particular data record;

when the first number of times the processing rule was executed is less than a threshold number of times, determine a content criterion indicative of a characteristic of content to be generated for each of one or more fields;

generate content according to the content criterion; and populate one or more data fields of a second set of data records with the content generated according to the content criterion, wherein the second set of data records populated with the generated content is sufficient to cause execution of the processing rule a second number of times equal to or greater than the threshold number of times when the second set of data records populated with the generated content is processed by the data processing application; and whereby the second set of data records is configured to be processed by the data processing application to test the data processing application.

26. The computing system of claim 25, in which generating content includes generating content based on a format specification for each of the fields.

27. The computing system of claim 25, in which populating the one or more data fields of the second set of data records includes:

creating a new data record including the one or more fields; and populating the one or more fields for the new data record.

28. The computing system of claim 25, in which populating the one or more data fields with the generated content includes modifying pre-existing content for one or more of the data fields of the second set of data records.

29. The computing system of claim 25, in which populating the one or more data fields includes creating a data field for one or more pre-existing data records.

30. The computing system of claim 25, in which the content criterion includes one or more of a target value, a target range of values, a target distribution of values, a maximum value, or a minimum value.

31. The computing system of claim 25, in which the content criterion includes particular values for the generated content.

32. The computing system of claim 25, in which the content criterion is indicative of a target combination of content to be included in two or more of the one or more data fields.

33. The computing system of claim 25, in which generating content includes generating content based on a generation mode.

34. The computing system of claim 33, in which the generation mode includes one or more of (i) generation of random content for one or more of the data fields for each of multiple data records, (ii) generation of unique content for one or more of the data fields for each of multiple data records, and (iii) selection of content for one or more of the data fields for each of multiple data records from a set of available content.

35. The computing system of claim 25, the instructions causing the computing system to provide the second set of data records including the generated content to the data processing application.

36. The computing system of claim 25, in which determining the content criterion includes determining the content criterion to cause the processing rule to be executed a number of times equal to or greater than the threshold number of times.

37. A computing system, including one or more processors and a memory, for generating content for data records to cause execution of a processing rule during processing of the data records, the computing system including:

means for receiving execution information indicative of a first number of times a processing rule of a data processing application was executed during processing of a first set of data records by the data processing application, wherein whether the processing rule is executed by the data processing application during processing of a particular data record depends directly or indirectly on a value in each of one or more data fields of the particular data record;

means for, when the first number of times the processing rule was executed is less than a threshold number of times, determining a content criterion indicative of a characteristic of content to be generated for each of one or more fields;

means for generating content according to the content criterion; and means for populating one or more data fields of a second set of data records with the content generated according to the content criterion, wherein the second set of data records populated with the generated content is sufficient to cause execution of the processing rule a second number of times equal to or greater than the threshold number of times when the second set of data records populated with the generated content is processed by the data processing application; and whereby the second set of data records is configured to be processed by the data processing application to test the data processing application.

* * * * *

UNITED STATES PATENT AND TRADEMARK OFFICE
CERTIFICATE OF CORRECTION

PATENT NO. : 10,437,701 B2
APPLICATION NO. : 16/181582
DATED : October 8, 2019
INVENTOR(S) : Marshall A. Isman and Richard A. Epstein It is certified that error appears in the above-identified patent and that said Letters Patent is hereby corrected as shown below:

In the Claims

Column 26, Line 7, Claim 3, delete "which" and insert -- in which --.

Column 26, Line 16, Claim 5, delete "which" and insert -- in which --.

Column 26, Line 25, Claim 8, delete "which" and insert -- in which --.

Column 26, Line 28, Claim 9, delete "which" and insert -- in which --.

Column 26, Line 40, Claim 12, delete "which" and insert -- in which --.

Column 27, Line 20, Claim 16, delete "preexisting" and insert -- pre-existing --.

Signed and Sealed this
Seventeenth Day of December, 2019

Andrei Iancu
*Director of the United States Patent and Trademark Office*